United States Patent Office 3,431,258
Patented Mar. 4, 1969

3,431,258
STEROIDAL 4-HYDROXY-2-BUTENOIC ACID LACTONES
Yvon Lefebvre, Pierrefonds, Quebec, and Jean Marie Ferland, Ville St. Leonard, Quebec, Canada, assignors to American Home Products Corporation, New York, N.Y., a corporation of Delaware
No Drawing. Continuation-in-part of application Ser. No. 552,389, May 24, 1966. This application Apr. 10, 1967, Ser. No. 629,358
U.S. Cl. 260—239.57    18 Claims
Int. Cl. C07c *173/00;* A61k *17/00*

ABSTRACT OF THE DISCLOSURE

There are disclosed herein 2-[3'-, 11'-, or 17'-substituted androstan- or 4'-androsten- or 1',4'-androstadien- or 4'-estren- or 1',3',5'(10')-estratrien- or 1',3',5'(10'),6',8',(9')-estrapentaen-17'-yl]-4-hydroxy-2-butenoic acid lactones and their 4-halogenated derivatives, as well as 23-desoxo-21-oxocard-20(22)-enolides and their 23-halogenated derivatives. The compounds are prepared by oxidation with a hypohalous acid of the corresponding 17-[3'-furyl]-steroid derivatives which are also disclosed. The compounds are useful as cardiotonic, anti-inflammatory, cholesterol lowering, and mineralocorticoid agents, and methods for their preparation and use are also given.

---

This application is a continuation-in-part of our earlier-filed U.S. patent application S.N. 552,389, filed May 24, 1966.

This invention relates to steroids which possess a 4-hydroxy-2-butenoic acid acid lactone joined to the C–17 position of the steroid nucleus, to the intermediates used in their preparation, and to a process for preparing the compounds of this invention.

In one aspect of our invention there is herein disclosed a new generic class of steroid compounds which may be generically represented by the formula

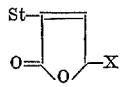

wherein St represents a steroid nucleus selected from the steroids of the estrane series and steroids of the androstane series, and X is a substituent selected from the group which consists of hydrogen, chlorine and bromine, said attachment to said steroid nucleus, St being at position-17 thereof.

Our invention also involves a new process, capable of use in preparing compounds of the generic class represented above, and also capable of preparing other compounds, not necessarily novel, wherein a steroid compound of the formula

wherein St represents a steroid radical selected from the group which consists of steroids of the estrane series and steroids of the androstane series, is treated with a hypohalous acid, whereby said furan ring portion of said steroid compound is oxidized to the corresponding 4-hydroxy-2-butenoic acid lactone.

Our invention therefore relates to novel steroids of general Formula II in which St represents a steroid radical derived from the estrane or androstane series. These novel steroids may be prepared from the corresponding 17-[3'-furyl]-substituted steroids of general Formula I in which St. has the above-defined significance by utilizing the novel process as herein described. If primary or second alcohol groups, or isolated double bonds, are present in the steroid nucleus, said alcohol functions may first be protected by esterification or etherification, and isolated double bonds are preferably protected by bromination.

In one embodiment our process may therefore be described by the schematic representation, I→(II+III)→II, St representing a steroid nucleus as above defined, and X representing a halogen atom as, for example, bromine or chlorine.

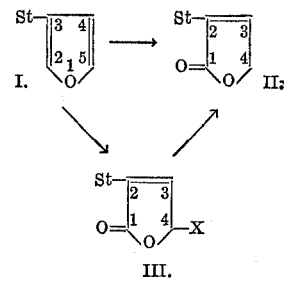

More specifically, this invention relates to novel steroids of the general Formula II in which the radical St represents radicals of the general Formulae IV to VII in which $R^1$ represents hydrogen, a lower alkyl group containing from 1–4 carbon atoms, a cycloalkyl group containing from 5–6 carbon atoms, or an acyl group such as, for example, the acetyl, propionyl, or butanoyl group; $R^2$ represents two atoms of hydrogen, a hydroxyl group and a hydrogen atom, or an oxygen atom; $R^3$ represents a methyl group or a hydrogen atom; $R^4$ represents a hydroxyl group or a lower aliphatic acyloxy group such as, for example, the acetoxy, propionyloxy, or butanoyloxy group, and a hydrogen atom, or an oxygen atom; $R^5$ represents two atoms of hydrogen, or an oxygen atom; $R^6$ represents a hydrogen atom, a lower aliphatic acyl group such as, for example, the acetyl, propionyl or butanoyl group, or a hexoside group such as, for example, the glucosyl group or a hexosyl group as encountered in naturally occurring glucosides; Y represents a hydrogen atom, a hydroxyl group, or a lower aliphatic acyloxy group such as, for example, the acetoxy, propionyloxy or butanoyloxy group; and Z represents a hydrogen atom or a hydroxyl group. The dotted lines in ring B of Formula IV indicate that two double bonds in positions 6, 7 and 8, 9 may be present.

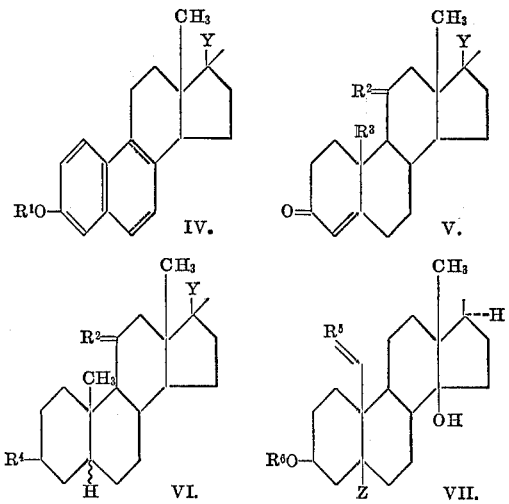

The novel products of this invention have cardiotonic, anti-inflammatory, cholesterol lowering, and mineralocorticoid activities. For example, the novel steroids which contain the radicals IV or VI possess cholesterol lowering activity; those which contain the radical V possess anti-inflammatory and cholesterol lowering activities; and those which contain the radical VII possess cardiotonic and mineralocorticoid activities. The compounds of this invention may be administered orally in the form of tablets or capsules containing 1 to 100 mg. of the active ingredient or by injection in the form of pharmaceutically acceptable sterile solutions or suspensions in oily vehicles containing from 1 to 100 mg. of the active ingredient on a daily basis or as directed by the physician.

The novel steroids of this invention are prepared by treating compounds of the general Formula I derived from the androstane or estrane series, provided these compounds do not contain an unprotected primary or secondary alcohol group or an unprotected isolated double bond with one to two molar equivalents of a hypohalous acid such as hypobromous or hypochlorous acid or a reagent capable of furnishing the elements of a hypohalous acid upon contact with water. Preferred reagents for this reaction are certain N-haloimides or N-haloamides, such as N-bromo- or N-chlorosuccinimide, or N-chloro- or N-bromoacetamide, used with or without small amounts of an acid, preferably perchloric acid; or the reaction may be carried out with an aqueous solution of an alkali metal salt of a hypohalite in contact with acid such as, for example, sodium hypochlorite and acetic acid. Water must be present and preferred organic solvents include aliphatic and cyclic ethers such as, for example, diethyl ether, dioxan or tetrahydrofuran; lower aliphatic ketones such as, for example, acetone or methyl ethyl ketone; aromatic hydrocarbons such as, for example, benzene, toluene, or xylene; lower aliphatic esters such as, for example, the lower alkyl acetates; lower aliphatic carboxylic acids such as, for example, acetic or butyric acid; lower aliphatic halogenated hydrocarbons such as, for example, chloroform, methylene chloride, or ethylene dichloride; and lower aliphatic tertiary alcohols such as, for example, t-butanol. Primary and secondary alcohols are not operative and must be excluded. The time of reaction may extend from five minutes to twenty-four hours, and reaction conditions are preferably chosen so as to complete the reaction within one-half hour. The temperature range at which the reactions may be carried out is from 0°–50° C., with temperatures of about 20–30° C. being the preferred range. The reaction product is isolated by extraction with a water-immiscible solvent, preferably with ether, washing with water or saturated sodium chloride solution, drying and evaporating the solvent. The resultant crude product is a mixture of compounds of the general Formulae II and III. The compounds of Formulae II and III may be separated from the mixture by chromatography or by crystallization. The halolactones of Formula III may be converted to the corresponding lactones of Formula II by treatment with zinc and acetic acid.

More specifically, we prefer to use two molar equivalents of a reagent capable of furnishing a hypohalous acid per mole of steroid in the above process. In this manner we obtain a crude product which is predominantly composed of the halolactone of Formula III. The total crude product is then reduced by zinc and acetic acid, to yield the novel steroids of Formula II.

Again more specifically, we prefer to use as starting materials for the preparation of the novel steroids of this invention certain 17-[3′-furyl]-substituted steroids of general Formula I in which the radical St represents radicals of the general Formulae IV to VII as defined above, provided that these starting materials do not contain any unprotected primary or secondary alcohol groups. Temporary protection for such primary or secondary alcohol groups can be readily provided by an acyl group, which after the preparation of the compounds of Formula II may be hydrolyzed under mildly basic conditions to yield the free hydroxyl group (N.B.: The 11β-hydroxy group requires no protection during the process of this invention).

The starting materials of the general Formula I wherein the radical St is represented by Formula IV in which $R^1$ is a lower alkyl group containing from 1–4 carbon atoms, a cycloalkyl group containing from 5–6 carbon atoms, or an aliphatic acyl group containing from 1–4 carbon atoms, and Y represents a 17β-hydroxyl group, are describer in U.S. Patent No. 3,271,392.

The starting materials of the general Formula I wherein the radical St is represented by Formulae V and VI, in which $R^4$ represents a lower aliphatic acyloxy group containing 1–4 carbon atoms and a hydrogen atom or an oxygen atom and $R^2$ and $R^3$ are as defined above and Y represents a 17β-hydroxyl group are obtained by reacting the corresponding 17-keto-derivative of Formula VIII or IX respectively, in which $R_2$ and $R_3$ are as defined above,

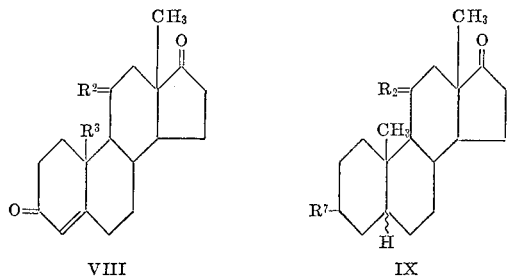

and $R^7$ represents a hydroxyl group and a hydrogen atom, or an oxygen atom, with 3-furyllithium in the manner described in U.S. Patent No. 3,271,392, viz, the 17-keto derivative is reacted with 3-furyllithium in mixtures of ether-benzene, ether-toluene, or ether-tetrahydrofuran at temperatures between room temperature and the reflux temperature of the respective mixture to yield the desired starting material; during this reaction it is essential to provide temporary protection of the 3-keto function of the 17-keto derivatives which possess this group such as, for example, 4-androstene-3,17-dione or androstane 3,11,17-trione, (N.B.: An 11-keto group requires no protection during the course of this addition reaction). Such temporary protection is advantageously afforded, for example, by an ethylenedioxy group; a methyl or ethyl enol ether, or a pyrrolidinyl enamine in the case of the derivatives of Formula VIII, or by a dimethyl or diethyl acetal group or an ethylenedioxy group in the case of the derivatives of Formula IX in which $R^7$ represents oxygen. These protecting groups may be conveniently and specifically removed by subjecting the resulting products to hydrolysis under mildly acidic conditions, for example with dilute hydrochloric acid in methanol. Also during the course of this reaction it is desirable but not essential to protect the 3-hydroxyl group of compounds of Formula IX in which $R^2$ is as defined above and $R^7$ represents a hydroxyl group and a hydrogen atom in order to avoid the wasteful and useless formation of a complex between the hydroxyl group and the furyllithium. Such protection is readily provided, for example, by a tetrahydropyranyl ether which subsequently can be easily and specifically removed by mild acidic conditions, for example by dilute hydrochloric acid in methanol. Subsequently, preferential acylation of the 3-hydroxy group, if present, may be accomplished by treating the just described starting materials with the appropriate lower aliphatic acid anhydrides or acid halides in the presence of a basic solvent at room temperature.

The 11-keto-17α-furyl compounds, as described above may be reduced to the corresponding 11β-hydroxyl derivatives, preferably when the protective group in position 3 is present.

The 17α-[3′-furyl]-substituted starting materials of general Formula I in which the St radical represents radicals of the Formulae IV, V, or VI in which $R^1$ represents a lower alkyl group containing 1–4 carbon atoms, a cycloalkyl group containing from 5–6 carbon atoms, or an aliphatic acyl group containing 1–4 carbon atoms, $R^4$ represents a lower aliphatic acyloxy group containing 1–4 carbon atoms and a hydrogen atom, or an oxygen atom, and $R^2$ and $R^3$ are as defined above and Y represents a 17β-hydroxyl group, have a threefold use.

First, they may be treated with a reagent capable of furnishing the elements of hypohalous acid as described above to yield a mixture of the novel steroids of this invention of Formulae II and III in which the St radical represents a radical of the Formulae IV, to VI, in which $R^1$, $R^2$, $R^3$, $R^4$ and Y have the same significance as defined in the preceeding paragraph, and X represents a halogen atom such as, bromine or chlorine.

Second these 17α-[3′-furyl]-substituted steroids of Formula I may be acylated at the tertiary hydroxyl group in position 17 by heating them with a mixture of the appropriate acid anhydride or acid chloride at 100° C. for 24 hours. The products of this latter treatment are then reacted with a reagent capable of furnishing the elements of hypohalous acid as described above to yield the novel steroids of this invention which are the corresponding 17β-acyloxy derivatives of the novel steroids described in the preceding paragraph.

Finally, these 17α-[3′-furyl]-substituted steroids may be converted to the starting materials of general Formula I in which the St radical represents the radicals IV, V or VI in which $R^2$ and $R^3$ are as defined above, and $R^1$ represents a lower alkyl group, a cycloalkyl group or an acyl group, $R_4$ represents an acyloxy group and a hydrogen atom, and Y represents a 17α-hydrogen atom. This latter conversion is schematically represented by formulae X→XI→XII in which Q represents rings A, B and C of the steroid radicals IV to VI as defined above, and is readily accomplished by subjecting the 17α-[3′-furyl]-substituted steroids, represented by Formula X such as, for example, 17α-[3′-furyl]-3 - methoxy - 1,3,5(10)-estratrien-17-ol, to the dehydrating action of a strong inorganic acid, preferably hydrochloric acid or p-toluenesulfonic acid, in an inert solvent, such as, for example, benzene, or by the dehydrating action of phosphorus oxychloride or thionyl chloride in pyridine. The resultant product of general Formula XI, for example, 17-[3′-furyl]-3-methoxy-1,3,5(10),16-estratetraene may then be hydrogenated using

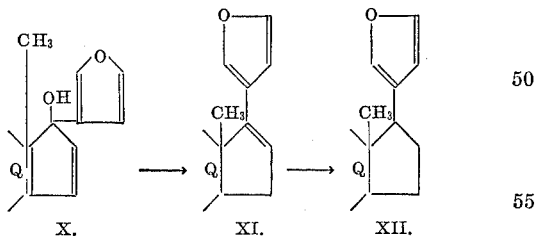

palladium on calcium carbonate to afford the 17β-[3′-furyl]-substituted steroid of general Formula XII, for example, 17β-[3′-furyl]-3 - methoxy - 1,3,5(10)-estratriene. However, if the 17α-[3′-furyl]-substituted steroid X contains a 3-ketone conjugated with a double bond at position 4, 5 for example, 17α-[3′-furyl]-17-hydroxy-4-androstene-3,11-dione, it is preferable to react said steroid with ethylene glycol in the presence of a small amount of p-toluenesulfonic acid thereby obtaining the 3-ethylenedioxy group while simultaneously introducing a double bond at position 16, 17 and shifting the double bond at position 4, 5 to position 5, 6. Subsequent preferential hydrogenation of the double bond at position 16, 17 with palladium on calcium carbonate followed by mild acid treatment to remove the ethylenedioxy affords the 17β-[3′-furyl]-substituted steroids of general Formula I in which St represents the steroid radical of Formula V and $R^2$ and $R^3$ have the same significance as defined above, and Y represents a 17α-hydrogen atom, for example, 17β-[3′-furyl]-4-androstene-3,11-dione. Alternatively, the 11β-hydroxy derivatives of the latter compounds are obtained when the above 11-keto derivatives are reduced, preferably while the protective group is still present. The 17β-[3′-furyl]-substituted estranes and androstanes of general Formula I in which the St radical represents the radicals IV to VI in which $R^1$, $R^2$, $R^3$ and $R^4$ have the same significance as described above and Y represents a 17α-hydrogen atom are then reacted with a reagent capable of furnishing the elements of hypohalous acid as described above to yield a mixture of the novel steroids of this invention of Formula II and III in which the St radical represents a radical of Formulae IV to VI in which $R^1$, $R^2$, $R^3$ and $R^4$ have the same significance as above. Y represents a 17α-hydrogen atom, and X represents a halogen atom such as, bromine or chlorine.

Compounds of the general Formula II in which the St radical is represented by Formula V and $R^2$ is as defined above, Y represents a 17α-hydrogen atom, and X represents 17α-hydrogen atom, a 17β-hydroxyl group or a 17β-lower acyloxy group containing from 2–4 carbon atoms, are readily converted by selenium dioxide, chloranil, p-benzoquinone or preferably dichlorodicyano-p-benzoquinone into the novel compounds of Formula XIII, in which $R^2$ and Y are as defined in this paragraph. These novel compounds are useful as cholesterol lowering agents, and as such may be administered as described above for the other novel products of this invention.

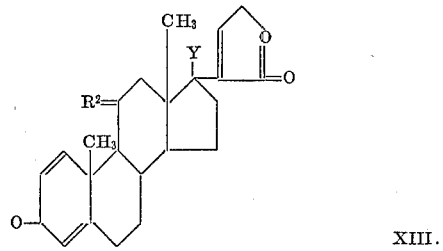

Finally the starting materials of general Formula I in which St represents a radical of Formula VII may be prepared by the method described by Minato and Nagasaki in Chemistry and Industry, 1965, p. 899, viz, by reduction with diisobutyl aluminium hydride of the appropriate cardenolides of Formula XIV

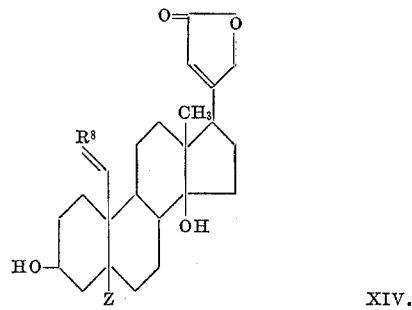

in which $R^8$ represents two atoms of hydrogen, or an oxygen atom, and Z represents a hydrogen atom or a hydroxyl group, to obtain the corresponding 17β-[3′-furyl]-substituted androstane derivatives of general Formula I in which St represents a radical of the Formula VII in which $R^5$ represents two hydrogen atoms, or an oxygen atom $R^6$ represents a hydrogen atom and Z represents a hydrogen atom or a hydroxyl group; during the course of this reduction it is necessary to provide temporary protection of the 19-aldehyde groups, such as, for example, the aldehyde group of strophanthidin of Formula XIV in which $R^8$ represents an oxygen atom and Z represents a hydroxyl group. Such temporary protection is advantageously afforded, for example, by the ethylenedioxy group which may be easily introduced by reacting the compound containing a reactive oxo group with ethylene glycol in the presence of a small amount of p-toluenesulfonic acid, and said protective ethylenedioxy group may be readily removed after completion of the reduction by subjecting the ethylenedioxy-substituted compound to hydrolysis with dilute hydrochloric acid in acetone solution as described by Lingner et al. in Arzneimittelforschung, vol. 13, p. 142 (1963).

These 17β-[3'-furyl]-substituted derivatives of general Formula I in which St represents a radical of Formula VII in which $R^5$ represents two hydrogen atoms or an oxygen atom, $R^6$ represents a hydrogen atom and Z represents a hydrogen atom or a hydroxyl group, may then be acylated at position 3 by treating them with the appropriate lower aliphatic acid anhydride or acyl chloride in pyridine solution.

The 17β-[3'-furyl]-substituted androstane derivatives of Formula I in which St represents a radical of Formula VII and $R^5$ represents two atoms of hydrogen or an oxygen atom, $R^6$ represents a lower aliphatic acyl group and Z represents a hydroxyl group or a hydrogen atom, obtained as above, are then treated with a reagent capable of furnishing the elements of hypohalous acid as described above, to yield a mixture of the desired steroids of this invention of Formulae II and III in which St represents a radical of Formula VII in which $R^5$, $R^6$ and Z are as defined in this paragraph and X represents a halogen atom such as bromine or chlorine.

These novel steroids of Formula II in which the St radical represents radicals IV, VI or VII, which possess a 3-acyloxy group may be hydrolyzed, preferably with potassium carbonate in methanol to obtain the corresponding 3-hydroxylated compounds of Formula II in which the St radical represents radicals IV, VI, and VII in which $R^2$, $R^3$, $R^5$ and Z are as defined above, and $R^1$ represents a hydrogen atom, $R^4$ represents a hydrogen atom and a hydroxyl group, $R^6$ represents a hydrogen atom and Y represents a 17β-hydroxyl group or a 17α-hydrogen atom.

Furthermore, these latter 3-hydroxylated compounds of Formula II in which St represents the radical VII in which $R^5$ represents two hydrogen atoms or an oxygen atom, $R^6$ represents a hydrogen atom and Z represents a hydrogen atom or a hydroxyl group may be converted to their corresponding 3β-glucosides or 3β-hexosides by reacting them with suitable hexose derivatives, such as, for example, with acetobromoglucose, preferably in dioxan solution, and in the presence of silver oxide and magnesium sulfate, as described by Elderfield et al. in J. Am. Chem. Soc., vol. 69, p. 2235 (1947), or in ethylene dichloride with silver carbonate as described by Zorback et al. in J. Med. Chem., vol. 6, p. 298 (1963). In this manner when using, for example, acetobromoglucose, there are obtained the corresponding 3β-tetraacetyl-d-glucosides of the compounds of this invention of Formula II in which St represents the radical VII in which $R^5$ and Z are as defined above and $R^6$ represents the tetraacetylglucosyl group. The latter compounds may then be deacylated, preferably with barium methoxide as described by Elderfield et al. cited above, to obtain the corresponding 3β-d-glucosides of the compounds of Formula II in which the St radical represents radical VII in which $R^5$ and Z are as defined above, and $R^6$ represents a d-glucosyl group.

The following examples will illustrate the scope of this invention.

EXAMPLE 1

A solution of 17α-[3'-furyl]-3-methoxy-1,3,5(10)-estratrien-17-ol (728 mg.) described in U.S. Patent No. 3,271,392, pyridine (14.5 ml.), and phosphorus oxychloride (1.45 ml.), is heated on a steam bath for 1 hour. The mixture is poured in ice-water and extracted with ether. The ether solution is washed with dilute sulfuric acid, sodium bicarbonate and water, dried and evaporated to dryness. The residue is discolored by treatment on activated charcoal and crystallized from methylene chloride-ether to give 17-[3'-furyl]-3-methoxy-1,3,5(10),16-estratetraene, M.P. 162.5–164° C.

By a similar procedure the 3-ethyl, 3-propyl, 3-isopropyl, 3-n-butyl, 3-sec.-butyl, 3-cyclopentyl and 3-cyclohexyl ethers of 17α-[3'-furyl]-1,3,5(10)-estratriene-3,17-diol, also described in U.S. Patent No. 3,271,392, are dehydrated to yield the corresponding 3-alkoxy- or 3-cycloalkoxy-17-[3'-furyl]-1,3,5(10),16-estratetraenes, such as, 3-ethoxy-17-[3'-furyl]-1,3,5(10),16-estratetraene, 17-[3'-furyl]-3-propoxy-1,3,5(10),16 - estratetraene, 17 - [3'-furyl]-3-isopropoxy-1,3,5(10),16-estratetraene, 3 - n - butoxy-17-[3'-furyl]-1,3,5(10),16-estratetraene, 3-sec. - butoxy-17-[3'-furyl]-1,3,5(10),16 - estratetraene, 3 - cyclopentyloxy-17-[3'-furyl]-1,3,5(10),16-estratetraene, and 3-cyclohexyloxy-17-[3'-furyl]-1,3,5(10),16-estratetraene.

Similarly dehydration of the 3-acyloxy-17α-[3'-furyl]-1,3,5(10),16-estratrien-17-ol, also described in U.S. Patent No. 3,271,392, yields the corresponding 3-acyloxy-17-[3'-furyl]-1,3,5(10),16-estratetraenes, such as, for example, 3-acetoxy-17-[3'-furyl]-1,3,5(10),16-estratetraene, 17-[3'-furyl]-3-propionyloxy-1,3,5(10),16 - estratetraene, 3-butanoyloxy-17-[3'-furyl]-1,3,5(10),16-estratetraene.

EXAMPLE 2

A mixture of 17-[3'-furyl]-3-methoxy-1,3,5(10),16-estratetraene (5.5 g.), obtained in Example 1, prehydrogenated 5% palladium on calcium carbonate (5.5 g.), and ethyl acetate (559 ml.), is hydrogenated for 2½ minutes. The catalyst is filtered and the filtrate is evaporated to dryness. The residue is chromatographed on alumina. The fractions eluted with mixtures of benzene and hexane are combined and crystallized from methylene chloride-hexane to give 17β-[3'-furyl]-3-methoxy-1,3,5(10)-estratriene M.P. 147–149° C.

By a similar procedure the other 3-alkoxy-17-[3'-furyl]-1,3,5(10),16-estratetraenes and 3-cycloalkoxy-17-[3'-furyl]-1,3,5(10),16-estratetraenes, obtained in Example 1, are hydrogenated to give the corresponding 3-alkoxy- and 3-cycloalkoxy-17β-[3'-furyl]-1,3,5(10)-estratrienes, such as, for example, 3-ethoxy-17β-[3'-furyl]-1,3,5(10)-estratriene, 17β-[3'-furyl]-3-propoxy-1,3,5(10)-estratriene, 3-n-butoxy-17β-[3'-furyl]-1,3,5(10)-estratriene, 3-sec.-butoxyl-17β-[3'-furyl]-1,3,5(10)-estratriene, 3-cyclopentyloxy-17β-[3'-furyl]-1,3,5(10)estratriene and 3-cyclohexyloxy-17β-[3'-furyl]-1,3,5(10)-estratriene.

Similarly the hydrogenation of the 3-acyloxy-17-[3'-furyl]-1,3,5(10),16-estratetraenes, described in Example 1, gives the corresponding 3-acyloxy-17β-[3'-furyl]-1,3,5(10)-estratrienes such as, for example, 3-acetoxy-17β-[3'-furyl]-1,3,5(10)-estratriene, 17β-[3'-furyl]-3-propionyloxy-1,3,5(10)-estratriene and 3-butanolyoxy-17β-[3'-furyl]-1,3,5(10)-estratriene.

EXAMPLE 3

A mixture of 3-iodofuran (6.6 g.), ether (182 ml.), and a 0.95 N ethereal solution of n-butyllithium (38.4 ml.), is stirred at −60° C. for 30 minutes. A solution of 3-ethoxy-3,5-androstadien-17-one (6.5 g.), prepared as described in J. Org. Chem. vol. 29, 601 (1964), in toluene (260 ml.), is added and the mixture is stirred at room temperature for 16 hours. Ether and water are added. The organic phase is separated and further washed with water to neutrality. After drying and evaporating the solvents, 3-ethoxy-17α-[3'-furyl]3,5-androstadien-17-ol is obtained. A solution of this compound (7.7 g.) in 95% ethanol (320 ml.), and water (53 ml.), is stirred for 16 hours at room temperature with 0.1 N solution of hydrochloric acid (107 ml.). Water is added and the mixture extracted with ether. The ether solution is washed with sodium bicarbonate and water, dried and evaporated to dryness. The residue is chromatographed on alumina. The fractions eluted with benzene-hexane and benzene are combined and crystallized from 95% ethanol to yield 17α-[3'-furyl]-17-hydroxy-4-androsten-3-one, M.P. 209–211° C.

By a similar procedure, 3-ethoxy-3,5-androstadiene-11,17-dione, 3-ethoxy-3,5-estradien-17-one, and 3-ethoxy-3,5-estradiene-11,17-dione, prepared respectively from 4-androstene-3,11,17-trione, 4-estrene-3,17-dione and 4-estrene-3,11,17-trione, according to the method described in J. Org. Chem., vol. 29, 601 (1964), yield upon treatment with 3-furyllithium 3-ethoxy-17α-[3'-furyl]-17-hydroxy-3,5-androstadien-11-one, 3-ethoxy-17α-[3'-furyl]-3,5-estradien-17-ol and 3-ethoxy-17α-[3'-furyl]17-hydroxy-3,5-estradien-11-one. The latter compounds in turn give 17α-[3'-furyl]17-hydroxy-4-androstene-3,11-dione, 17α-[3'-furyl]-17-hydroxy-4-estren-3-one, and 17α-[3'-furyl]-17-hydroxy-4-estrene-3,11-dione upon mild acid hydrolysis.

EXAMPLE 4

Pyrrolidine (42 ml.) is added dropwise to a boiling solution of 4-androstene-3,17-dione (42 g.), in methanol (1008 ml.). After cooling at 0° C. for 1 hour the resulting 3-[1'-pyrrolidinyl]-3,5-androstadien-17-one is filtered, thoroughly washed with methanol and dried.

A solution of 3-iodofuran (47.5 g.), in ether (950 ml.), and a 1.60 N ethereal solution of n-butyllithium (134 ml.), is stirred for 30 minutes at —60° C. Then a solution of 3-[1'-pyrrolidinyl]-3,5-androstadien-17-one (47.5 g.), obtained above, in toluene (1900 ml.), is added. The mixture is stirred for 16 hours at room temperature and the reaction product is isolated as previously indicated in Example 3 to yield 17α-[3'-furyl]-3-[1'-pyrrolidinyl]-3,5-androstadien-17-ol. A solution of this latter compound (62 g.), methanol (805 ml.), acetic acid (124 ml.), sodium acetate (186 g.) and water (186 ml.) is refluxed for 4 hours. The mixture is poured in ice water and is extracted with ether. The ether solution is washed with water, sodium bicarbonate and water again, dried and evaporated. The residue is chromatographed on alumina. The fractions eluted with benzene and mixtures of benzene-ether are combined and crystallized from 95% ethanol yielding 17α-[3'-furyl]-17-hydroxy-4-androsten-3-one, M.P. 207–208° C., identical in all respect with the compound obtained in Example 3.

EXAMPLE 5

Pyrrolidine (4 ml.) is added to a boiling solution of 4-estrene-3,17-dione (10 g.), described in J. Org. Chem. 25, 2248 (1960), in methanol (40 ml.). After cooling, the precipitate is filtered, well washed with methanol and dried to yield 3-[1'-pyrrolidinyl]-3,5-estradien-17-one.

A solution of 3-iodofuran (6.74 g.), ether (135 ml.) and a 1.42 N ethereal solution of n-butyllithium is stirred for 30 minutes at —60° C. A solution of 3-[1'-pyrrolidinyl]-3,5-estradien-17-one (6.74 g.), obtained above, in toluene (270 ml.) is added and the reaction mixture is left at room temperature for 16 hours. The reaction is worked up as in Example 3 to yield 17α-[3'-furyl]-3-[1'-pyrrolidinyl]-3,5-estradien-17-ol. The latter compound is hydrolyzed as in Example 4. The residue is chromatographed on alumina. The fractions eluted with benzene and mixtures of benzene and ethyl acetate are combined and crystallized from ethyl acetate to give 17α-[3'-furyl]-17-hydroxy-4-estren-3-one, M.P. 158–159° C.

By a similar procedure 3-[1'-pyrrolidinyl]3,5-estrene-11,17-dione, prepared as above from 4-estrene-3,11,17-trione, described in J. Am. Chem. Soc. 78, 1512 (1956), yields 17α-[3'-furyl]-17-hydroxy-3-[1'-pyrrolidinyl]-3,5-estradien-11-one, which upon hydrolysis gives 17α-[3'-furyl]-17-hydroxy-4-estren-3,11-dione.

EXAMPLE 6

Pyrrolidine (60 ml.), is added dropwise to a boiling solution of 4-androstane-3,11,17-trione (60 g.) in methanol (1440 ml.). The mixture is cooled in an ice-bath for 1 hour. The resulting solid is filtered, well washed with methanol and dried yielding 3-[1'-pyrrolidinyl]-3,5-androstadiene-11,17-dione.

A solution of iodofuran (66 g.), in ether (1320 ml.), and an ethereal solution (1.59 N) of n-butyllithium (188 ml.), is stirred at —60° C. for 30 minutes. A solution of the above enamine (66 g.) in toluene (2640 ml.) is added and the reaction is allowed to proceed at room temperature for 16 hours. The reaction is worked up as in Example 3, to yield 17α-[3'-furyl]-17-hydroxy-3[1'-pyrrolidinyl]-3,5-androstadien-11-one. This latter compound (79 g.) is hydrolyzed as in Example 4. The crude reaction product is crystallized from ethanol and then dioxan to give 17α-[3'-furyl]-17-hydroxy-4-androstene-3,11-dione, M.P. 251–254° C.

EXAMPLE 7

A mixture of 11α,17β-diacetoxy-4-androsten-3-one (29.74 g.), described in P. Org. Chem. 18, 1166 (1953), benzene (1487 ml.), ethylene glycol (148.7 ml.), and p-toluenesulfonic acid (2.97 g.) is refluxed and stirred for 20 hours in a flask equipped with a continuous water separator. After cooling, the solution is washed with sodium bicarbonate and water, dried and evaporated to yield 11α,17β - diactoxy - 3,3 - ethylenedioxy - 5 - androstene, purified by crystallization with methylene chloride-methanol (with a small amount of pyridine), M.P. 188–189° C.

A mixture of the above compound (21.5 g.), sodium hydroxide (5.4 g.), methanol (900 ml.), and water (86 ml.) is refluxed for 20 hours. The solvent is partially evaporated. Water is added and the precipitate is filtered washed and dried, yielding 3,3-ethylenedioxy-5-androstene-11α,17β-diol.

By a similar procedure 11α,17β-diacetoxy-4-estren-3-one described in J. Am. Chem. Soc. 78, 1512 (1956), yields a mixture of 11α,17β-diactoxy-3,3-ethylenedioxy-5-estrene and 11α,17β-diacetoxy-3,3-ethylenedioxy-5(10)-estrene, which upon alkaline hydrolysis gives a mixture of 3,3-ethylenedioxy-5-estrene-11α,17β diol and 3,3-ethylenedioxy-5(10)estrene-11α,17β-diol.

Similarly 17β-hydroxy-4-androsten-3-one and 17β-hydroxy-4-estren-3-one are treated with ethylene glycol and p-toluenesulfonic acid in benzene to yield respectively, 3,3-ethylenedioxy-5-androsten-17β-ol, and a mixture of 3,3-ethylenedioxy-5-estren-17β-ol and 3,3-ethylenedioxy-5(10)-estren-17β-ol.

EXAMPLE 8

Chromium trioxide (17.2 g.) is cautiously added to dry pyridine cooled at —20° C. To this complex a solution of 3,3-ethylenedioxy - 5 - androsten - 11α,17β - diol (17.2 g.) obtained in Example 7 in pyridine (172 ml.), is added dropwise. The mixture is stirred for 32 hours at room temperature. The mixture is filtered on celite, the filtrate is diluted with water, and extracted with ether. The ether is washed with dilute sulfuric acid, sodium bicarbonate and water, drid and evaporated yielding, 3,3-ethylenedioxy-5-androstene-11,17-dione, purified by crystallization with methanol (containing small amounts of pyridine), M.P. 208–210° C.

Similarly oxidation of the mixture of 3,3-ethylenedioxy-5-estrene-11α,17β-diol and 3,3-ethylenedioxy-5(10)-estrene-11α,17β-diol obtained in Example 7 yields a mixture of 3,3-ethylenedioxy-5-estrene-11,17-dione and 3,3-ethylenedioxy-5(10)-estrene-11,17-dione.

Similarly oxidation with chromium trioxide/pyridine complex in pyridine solutions of 3,3-ethylenedioxy-5-androsten-17β-ol and a mixture of 3,3-ethylenedioxy-5-estren-17β-ol and 3,3-ethylenedioxy-5(10)-estren-17β-ol obtained as described in Example 7, yields respectively 3,3-ethylenedioxy-5-androsten-17-one and a mixture of 3,3-ethylenedioxy-5-estren-17-one and 3,3-ethylenedioxy-5(10)-estren-17-one.

EXAMPLE 9

A solution of 3-iodofuran (12 g.), ether (240 ml.), and a 1.55 N ethereal of n-butyllithium is stirred for 30 minutes at −60° C. A solution of 3,3-ethylenedioxy-5-androstene-11,17-dione (13.1 g.), prepared in Example 8, in toluene (480 ml.) is added and the mixture is stirred at room temperature for 16 hours. The reaction is worked up as in Example 3, yielding 3,3-ethylenedioxy-17α-[3'-furyl]-17-hydroxy-5-androsten-11-one purified by crystallization with methylene chloride-methanol (with small quantities of pyridine), M.P. 250–253° C.

By a similar procedure a mixture of 3,3-ethylenedioxy-5-estrene-11,17-dione, and 3,3-ethylenedioxy-5(10)-estrene-11,17-dione obtained in Example 8, is transformed into a mixture of 3,3-ethylenedioxy-17α-[3'-furyl]-17-hydroxy-5-estren-11-one and 3,3-ethylenedioxy-17α-[3'-furyl]-17-hydroxy-5(10)-estren-11-one, when treated with 3-furyllithium.

Similarly reaction with 3-furyllithium of 3,3-ethylenedioxy-5-androsten-17-one, and a mixture of 3,3-ethylenedioxy-5-estren-17-one and 3,3-ethylenedioxy-5(10)-estren-17-one obtained in Example 8, yields respectively 3,3-ethylenedioxy-17α-[3'-furyl]-5-androsten-17-ol, and a mixture of 3,3-ethylenedioxy-17α-[3'-furyl]-5-estren-17-ol and 3,3-ethylenedioxy-17α-[3'-furyl] - 5(10) - estren-17-ol.

EXAMPLE 10

A solution of 3,3-ethylenedioxy - 17α - [3'-furyl]-17-hydroxy-5-androsten-11-one (9.9 g.), described in Example 9, in dry tetrahydrofuran (198 ml.), is added dropwise to a mixture of lithium aluminium hydride (4.95 g.) and tetrahydrofuran (297 ml.). The mixture is refluxed for 4 hours. To the cold mixture ethyl acetate (40 ml.) is added, followed by a saturated sodium chloride solution (60 ml.). The inorganic salts are filtered and washed with tetrahydrofuran. The filtrate is evaporated and the residue is dissolved in a mixture of methylene chloride-ether. The organic solution is washed with a saturated solution of ammonium chloride and water dried and evaporated yielding 3,3-ethylene-dioxy-17α-[3'-furyl[-5-androstene-11β,17-diol, purified by crystallization with methanol-ether, M.P. 197–199° C.

By a similar procedure reduction with lithium aluminium hydride of a mixture of 3,3-ethylenedioxy-17α-[3'-furyl]-17-hydroxy-5-estren-11-one, and 3,3-ethylenedioxy-17α-[3'-furyl]-17-hydroxy-5-(10)-estren-11-one obtained in Example 9, yields a mixture of 3,3-ethylenedioxy-17α-[3'-furyl]-5-estrene-11β,17-diol and 3,3-ethylenedioxy-17α-[3'-furyl]5-(10)-estrene-11β,17-diol.

EXAMPLE 11

A solution of, 3,3 - ethylenedioxy - 17α - [3' - furyl] - 5 - androstene-11β,17-diol (7.9 g.), obtained in Example 10, 95% ethanol (316 ml.), water (36.4 ml.), and a 1 N solution of hydrochloric acid (104 ml.) is stirred at room temperature for 4 hours. The reaction mixture is made alkaline by the addition of sodium bicarbonate, and the solvent is evaporated to dryness. The residue is taken up in ether and water. The ether solution is further washed with water, dried and evaporated. The residue is chromatographed on silica gel. The fractions eluted with mixtures of ethyl acetate-benzene are combined and crystallized from methanol-ether to give 11β,17β-dihydroxy-17-[3'-furyl]-4-androsten-3-one, M.P. 198–200° C.

By a similar procedure the 3-ketal of a mixture of 3,3-ethylenedioxy - 17α - [3' - furyl]-5-estrene-11β,17-diol and 3,3-ethylenedioxy-17α-[3'-furyl] - 5(10) - estrene - 11β,17-diol, described in Example 10, is hydrolyzed to yield 11β,17β-dihydroxy-17-[3'-furyl]-4-estrene-3-one.

By a similar hydrolysis procedure 3,3 - ethylenedioxy - 17α-[3'-furyl]-5-androsten-17-ol, and a mixture of 3,3-ethylenedioxy-17α-[3'-furyl]-5-estren-17-ol and 3,3-ethylenedioxy-17α-[3'-furyl]-5(10)-estren-17-ol obtained in Example 9 are respectively transformed into 17α-[3'-furyl]-17-hydroxy-4-androsten-3-one and 17α-[3'-furyl]-17-hydroxy-4-estren-3-one.

Similarly hydrolysis of the 3,3-ethylenedioxy group in 3,3 - ethylenedioxy - 17α - [3' - furyl - 17 - hydroxy - 5 - androsten-11-one and a mixture of 3,3-ethylenedioxy-17α-[3'-furyl]-5-estren-11-one and 3,3-ethylenedioxy-17α-[3'-furyl]-17-hydroxy-5(10)-estren-11-one described in Example 9 yields respectively 17α-[3'-furyl]-17-hydroxy-4-androstene-3,11-dione and 17α-[3'-furyl]-17-hydroxy-4-estrene-3,11-dione.

EXAMPLE 12

By a similiar procedure as described in Example 10, 3-ethoxy-17α-[3'-furyl]-17-hydroxy-3,5,-androstadien-11-one, and 3-ethoxy-17α-[3'furyl]-17-hydroxy-3,5-estradien-11-one obtained in Example 3 are reduced by lithium aluminium hydride in tetrahydrofuran solutions to yield respectively 3 - ethoxy - 17α - [3' - furyl] - 3,5 - androstadiene-11β,17-diol and 3 ethoxy-17α-[3'-furyl]-3,5-estradiene-11β,17-diol.

Removal of the protecting group in the latter two compounds according to the method given in Example 3, yields respectively 11β,17β-dihydroxy-17-[3'-furyl]-4-androsten-3-one and 11β,17β-dihydroxy-17-[3'-furyl]-4-estren-3-one.

EXAMPLE 13

By a similar procedure as described in Example 10, reduction with lithium aluminium hydride of 17α-[3'-furyl]-17-hydroxy-3-[1'-pyrrolidinyl]-3,5-estradien-11-one, obtained in Example 5, and 17α-[3'-furyl]-17-hydroxy-3-[1'-pyrrolidinyl]-3,5-androstadien-11-one, obtained in Example 6, yields respectively 17α-[3'-furyl] - 3 - [1'-pyrrolidinyl]-3,5-estradiene - 11β,17 - diol and 17α-[3'-furyl]-3-[1'-pyrrolidinyl]-3,5-androstadiene-11β,17-diol.

Removal of the 3-enamine protecting group in the latter two compounds by the method of Example 4 yields respectively 11β,17β-dihydroxy-17-[3'-furyl]-4-estren-3-one and 11β ,17β-dihydroxy-17[3'-furyl]-4-androsten-3-one.

EXAMPLE 14

In a three-neck flask, equipped with a stirrer and a water separator, a solution of 17α-[3'-furyl]-17-hydroxy-4-androsten-4-one (25 g.), described in Example 3, benzene (1250 ml.), ethylene glycol (125 ml.), and p-toulenesulfonic acid (2.5 g.) is refluxed and stirred for 20 hours. The cold solution is washed with bicarbonate and water dried and evaporated, yielding, 3,3-ethylenedioxy-17-[3'-furyl]-5,16-androstadiene, purified by crystallization from methylene chloride-methanol, containing a small quantity of pyridine, M.P. 228–231° C.

Similarly ketalization of 17α-[3'-furyl]-17-hydroxy-4-estren-3- one, obtained in Example 5, yields a mixture of 3,3-ethylenedioxy-17-[3'-furyl]-5,16-estradiene and 3, 3-ethylenedioxy-17-[3'-furyl]-5(10),16-estradiene.

EXAMPLE 15

A mixture of 17α-[3'-furyl]-17-hydroxy-4-androstene-3,11-dione (1 g.), obtained in Example 6, benzene (50 ml.), ethylene glycol (5 ml.), and p-toluenesulfonic acid (100 mg.), is refluxed and stirred for 20 hours in a flask equipped with a continuous water separator. The reaction is worked up as in Example 14, yielding 3,3-ethylenedioxy - 17 - [3' - furyl] - 5,16 - androstadien - 11-one, purified by crystallization with methylene chloride-methanol (with pyridine), M.P. 205–207° C.

Similarly ketalization of 17α-[3'-furyl]-17-hydroxy-4-estrene-3,11-dione, obtained in Example 5 yields a mixture of 3,3-ethylenedioxy-17-[3'-furyl]-5,16-estradien-11-one and 3,3-ethylenedioxy-17-[3'-furyl]-5(10),16-estradien-11-one.

EXAMPLE 16

A mixture of 3,3-ethylenedioxy-17-[3'-furyl]-5,16-androstadien-11-one (500 mg.), obtained in Example 15, ethylacetate (23.5 ml.) and prehydrogenated 5% palladium on calcium carbonate (125 mg.) is hydrogenated at room temperature and at normal pressure for 5 minutes. The catalyst is filtered and the filtrate is evaporated to dryness yielding 3,3-ethylenedioxy-17β-[3′-furyl]-5-androsten-11-one, purified by crystallization from acetone-hexane, M.P. 176–178° C.

By a similar procedure hydrogenation of 3,3-ethylenedioxy-17-[3′-furyl]-5,16-androstadiene, obtained in Example 14, the mixture of 3,3-ethylenedioxy-17-[3′-furyl]-5,16-estradiene and 3,3-ethylenedioxy-17-[3′-furyl]-5(10),16-estradiene, obtained in Example 14, and the mixture of 3,3-ethylenedioxy-17-[3′-furyl]-5,16-estradien-11-one, and 3,3-ethylenedioxy-17-[3′-furyl]-5(10),16-estradien-11-one obtained in Example 15, yields respectively 3,3-ethylenedioxy-17β-[3′-furyl]-5-androstene, M.P. 186–188° C., a mixture of 3,3-ethylenedioxy-17β-[3′-furyl]-5-estrene and 3,3-ethylenedioxy-17β-[3′-furyl]-5(10)-estrene, and a mixture of 3,3-ethylenedioxy-17β-[3′-furyl]-5-estren-11-one and 3,3-ethylenedioxy-17β-[3′-furyl]-5(10)-estren-11-one.

EXAMPLE 17

A solution of 3,3-ethylenedioxy-17β-[3′-furyl]-5-androsten-11-one (4.8 g.), obtained in Example 16, in dry tetrahydrofuran (96 ml.), is added dropwise to a stirred mixture of lithium aluminium hydride (2.4 g.) in tetrahydrofuran (144 ml.). The mixture is refluxed for 4 hours. The reaction product is isolated as indicated in Example 10. Crystallization of the crude product from acetone-methanol yields 3,3-ethylenedioxy-17β-[3′-furyl]-5-androsten-11β-ol, M.P. 185–187° C.

Similarly reduction with lithium aluminium hydride of the mixture of 3,3-ethylenedioxy-17β-[3′-furyl]-5-estren-11-one and 3,3-ethylenedioxy-17β-[3′-furyl]-5(10)-estren-11-one, obtained in Example 16, yields a mixture of 3,3-ethylenedioxy-17β-[3′-furyl]-5-estren-11β-ol and 3,3-ethylenedioxy-17β-[3′-furyl]-5(10)-estren-11β-ol.

EXAMPLE 18

A mixture of 3,3-ethylenedioxy-17β-[3′-furyl]-5-androsten-11β-ol (2.1 g.), obtained in Example 17, acetone (88 ml.), and p-toluenesulfonic acid (210 mg.), is refluxed for 1 hour. Water is added and the mixture is extracted with ether. The ether is washed with sodium bicarbonate and water, dried and evaporated, leaving 17β-[3′-furyl]-11β-hydroxy-4-androsten-3-one, purified by crystallization from 2-methoxyethanol and then acetone, M.P. 207–209° C.

Similarly hydrolysis of the 3,3-ethylenedioxy group in the mixture of 3,3-ethylenedioxy-17β-[3′-furyl]-5-estren-11β-ol, and 3,3-ethylenedioxy-17β-[3′-furyl]-5(10)-estren-11β-ol described in Example 17 yields 17β-[3′-furyl]11β-hydroxy-4-estren-3-one.

EXAMPLE 19

A mixture of 3,3-ethylenedioxy-17β-[3′-furyl]-5-androstene (18.8 g.), obtained in Example 16, acetone (780 ml.), and p-toluenesulfonic acid (1.88 g.) is refluxed for 1 hour. The reaction is worked up as in Example 18, yielding 17β-[3′-furyl]-4-androsten-3-one, purified by crystallization from methanol, M.P. 187–188°.

Similarly hydrolysis of the 3,3-ethylenedioxy group in the mixture of 3,3-ethylenedioxy-17β-[3′-furyl]-5-estrene and 3,3-ethylenedioxy-17β-[3′-furyl]-5(10)-estrene described in Example 16, yields 17β-[3′-furyl]-4-estren-3-one.

EXAMPLE 20

A mixture of 3,3-ethylenedioxy-17β-[3′-furyl]-5-androsten-11-one (6.25 g.), described in Example 16, acetone (250 ml.), and p-toluenesulfonic acid (637 mg.), is refluxed for 1 hour. The solution is diluted with water and ether. The ether layer is separated, washed with sodium bicarbonate and water, dried and evaporated yielding 17β-[3′-furyl]-4-androstene-3,11-dione, recrystallized from acetone-hexane, M.P. 189–190° C.

By a similar procedure hydrolysis of the ketal group in the mixture 3,3-ethylenedioxy-17β-[3′-furyl]-5-estren-11-one and 3,3-ethylenedioxy-17β-[3′-furyl]-5(10)-estren-11-one, obtained in Example 16, yields 17β-[3′-furyl]-4-estrene-3,11-dione.

EXAMPLE 21

A mixture of 17α-[3′-furyl]-17-hydroxy-4-androsten-3-one (1 g.), obtained in Example 3, methylene chloride (15 ml.), ether (15 ml.), and a 25% hydrochloric acid solution (8 ml.), is stirred at room temperature for 18 hours. The water phase is separated and the organic solution is washed with sodium bicarbonate and water, dried and evaporated. The residue is crystallized from methanol to yield 17-[3′-furyl]-4,16-androstadiene-3-one, M.P. 124–126° C.

By a similar procedure 17α-[3′-furyl]-17-hydroxy-4-estrene-3-one, and 17α-[3′-furyl]-17-hydroxy-4-estrene-3,11-dione, obtained in Example 5, and 17α-[3′-furyl]-17-hydroxy-4-androstene-3,11-dione, obtained in Example 6 are respectively transformed by acid dehydration to 17-[3′-furyl]-4,16-estradien-3-one, 17-[3′-furyl]-4,16-estradiene-3,11-dione and 17-[3′-furyl]-4,16-androstadiene-3,11-dione.

EXAMPLE 22

A mixture of 17-[3′-furyl]-4,16-androstadien-3-one (7.76 g.), obtained in Example 21, ethyl acetate (360 ml.), and prehydrogenated 5% palladium on calcium carbonate (1.95 g.) is hydrogenated for 5 minutes. The catalyst is filtered and the filtrate evaporated to dryness, yielding 17β-[3′-furyl]-4-androsten-3-one, purified by crystallization from methanol, M.P. 186–188° C.

Similarly hydrogenation of 17-[3′-furyl]-4,16-estradien-3-one, 17-[3′-furyl]-4,16-estradiene-3,11-dione and 17-[3′-furyl]-4,16-androstadiene-3,11-dione, obtained in Example 21, yields respectively 17β-[3′-furyl]-4-estren-3-one, 17β-[3′-furyl]-4-estrene-3,11-dione and 17β-[3′-furyl]-4-androstene-3,11-dione.

EXAMPLE 23

A solution of 5α-androstane-3,17-dione (1 g.), oxalic acid (500 mg.), and methanol (15 ml.), is left at room temperature for 90 minutes. After cooling the solution to 0° C. the acid is neutralized by the addition of a cold solution of sodium bicarbonate. The mixture is extracted with ether. The ether is washed with water, dried and evaporated yielding 3,3-dimethoxy-5α-androstan-17-one, purified by crystallization with hexane (containing a few drops of pyridine), M.P. 122–125° C.

By a similar procedure 5β-androstane-3,17-dione, described in J. Org. Chem. 25, 1399 (1960), 5α-androstane, 3,11,17-trione, described in Helv. Chem. Acta 36, 652 (1953), and 5β-androstane-3,11,17-trione, described in Helv. Chem. Act. 36, 1266 (1953), are transformed in the corresponding 3,3-dimethoxy-5β-androstan-17-one, 3,3-dimethoxy-5α-androstane-11,17-dione, and 3,3-dimethoxy-5β-androstane-11,17-dione.

A solution of 3-iodofuran (21.4 g.), ether (350 ml.), and a 1.1 N ethereal solution of n-butyllithium (88.9 ml.), is stirred at —60° C. for 30 minutes. A solution of 3-3-dimethoxy-5α-androstan-17-one (21.3 g.), described above, in toluene (500 ml.), is added and the mixture is stirred at room temperature for 16 hours. The reaction is worked up as in Example 3, to give 3,3-dimethoxy-17α-[3′-furyl]-5α-androstan-17-ol. A solution of the latter compound and oxalic acid (15 g.) in acetone (500 ml.), and water (50 ml.), is stirred for 3 hours at room temperature. Addition of water gives 17α-[3′-furyl]-17-hydroxy-5α-androstan-3-one, M.P. 236–238° C., crystallized from methylene chloride-hexane.

Similarly, 3,3-dimethoxy-5β-androstan-17-one, 3,3-dimethoxy-5α-androstane-11,17-dione and 3,3-dimethoxy-5β-androstane-11,17-dione, described above, are treated with 3-furyllithium to give 3,3-dimethoxy-17α-[3′-furyl]-5β-androstan-17-ol, 3,3-dimethoxy-17α-[3′-furyl]-17-hydroxy-5α-androstan-11-one, and 3,3-dimethoxy-17α-[3′-furyl]-17-hydroxy-5β-androstan-11-one, respectively.

Hydrolysis of the dimethoxy group in the above compounds yields respectively, 17α-[3'-furyl]-17-hydroxy-5β-androstan-3-one, 17α-[3'-furyl]-17-hydroxy-5α-androstane-3,11-dione, and 17α-[3'-furyl]-17-hydroxy-5β-androstane-3,11-dione.

EXAMPLE 24

Treatment of 3,3-ethylenedioxy-5α-androstan-17-one, described in Bull. Soc. Chim. Fr., page 68 (1965), with 3-furyllithium as in Example 3, yields 3,3-ethylenedioxy-17α-[3'-furyl]-5α-androstan-17-ol, which upon hydrolysis as described in Example 11, is transformed into 17α-[3'-furyl]-17-hydroxy-5α-androstan-3-one.

Similarly 3,3-ethylenedioxy-5β-androstan-17-one, prepared from 17β-hydroxy-5β-androstan-3-one, according to the method described in Bull. Soc. Chim. Fr., page 68 (1965), yields 3,3-ethylenedioxy-17α-[3'-furyl]-5β-androstan-17-ol, which upon mild acid hydrolysis gives 17α-[3'-furyl]-17-hydroxy-5β-androstan-3-one.

In a similar manner 3,3-ethylenedioxy-5β-androstane-11,17-dione, prepared according to the method of Example 8 from 11α,17β-dihydroxy-5β-androstan-3-one, described in U.S. Patent 2,877,162, yields 3,3-ethylenedioxy-17α-[3'-furyl]-17-hydroxy-5β-androstan-11-one, transformed by acid hydrolysis to 17α-[3'-furyl]-17-hydroxy-5β-androstane-3,11-dione.

EXAMPLE 25

Reduction with lithium aluminium hydride as described in Example 10, of 3,3-dimethoxy-17α-[3'-furyl]-17-hydroxy-5α-androstan-11-one, and 3,3-dimethoxy-17α-[3'-furyl]-17-hydroxy-5β-androstan-11-one, obtained in Example 23, yields respectively 3,3-dimethoxy-17α-[3'-furyl]-5α-androstane-11β,17-diol, and 3,3-dimethoxy-17α-[3'-furyl]-5β-androstane-11β,17-diol. Hydrolysis of the protecting 3,3-dimethoxy group as described in Example 23, gives 11β,17β-dihydroxy-17-[3'-furyl]-5α-androstan-3-one, and 11β,17β-dihydroxy-17-[3'-furyl]-5β-androstan-3-one.

EXAMPLE 26

A solution of 3-iodofuran (26 g.), ether (500 ml.), and a 1.3 N ethereal solution of n- butyllithium (92.6 ml.) is stirred at —60° C. for 30 minutes. A solution of 3β-tetrahydropyranyloxy-5α-androstan-17-one (26 g.), described in J. Am. Chem. Soc. 83, 1478 (1961), in toluene (700 ml.) is added. After stirring for 16 hours at room temperature, the reaction is worked as in Example 3, yielding 17α-[3'-furyl]-3β-tetrahydropyranyloxy-5α-androstan-17-ol.

A solution of the latter product (30.5 g.), p-toluenesulfonic acid (300 mg.), in methanol (300 ml.) is stirred for 1 hour at room temperature. Addition of water yields 17α-[3'-furyl]-5α-androstane-3β,17-diol, purified by crystallization with ethyl acetate-hexane, M.P. 206–208° C.

By a similar method 3β-tetrahydropyranyloxy-5β-androstan-17-one prepared by the method described in J. Am. Chem. Soc. 83, 1478 (1961) is treated with 3-furyllithium to give 17α-[3'-furyl]-3β-tetrahydropyranyloxy-5β-androstan-17-ol. Hydrolysis of the protecting group in the latter compound gives 17α-[3'-furyl]-5β-androstane-3β,17-diol.

EXAMPLE 27

A solution of 17α-[3'-furyl]-5α-androstane-3β,17-diol (13.0 g.), described in Example 26, pyridine (130 ml.), and acetic anhydride (65 ml.), is left at room temperature for 16 hours. The reaction mixture is poured in ice-water and is extracted with ether. The ether solution is washed with dilute sulfuric acid, sodium bicarbonate and water, dried and evaporated. The crude product is crystallized from methylene chloride-hexane to give 3β-acetoxy-17α-[3'-furyl]-5α-androstan-17-ol, M.P. 133–134° C.

Similarly acylation with acylating agents other than acetic anhydride yields the corresponding 3β-acyloxy-17α-[3'-furyl]-5α-androstan-17-ol, such as, for example, 17α-[3'-furyl]-3β-propionyloxy-5α-androstan-17-ol, and 3β-butanoyloxy-17α-[3'-furyl]-5α-androstan-17-ol.

By a similar procedure acylation of 17α-[3'-furyl]-5β-androstane-3β,17-diol, obtained in Example 26, yields the corresponding 3-acyloxy derivatives such as, for example, the 3β-acetoxy-, 3β-propionyloxy- or 3β-butanoyloxy-17α-[3'-furyl]-5β-androstan-17-ols.

EXAMPLE 28

A mixture of 17α-[3'-furyl]-17-hydroxy-5α-androstan-3-one (540 mg.), obtained in Example 23, ether (150 ml.), and a 25% solution of hydrochloric acid (50 ml.), is stirred for 30 minutes. The reaction is worked up as in Example 21, yielding 17-[3'-furyl]-5α-androst-16-en-3-one, purified by crystallization from methylene chloride-ether, M.P. 195–196° C.

Similarly dehydration of 17α-[3'-furyl]-17-hydroxy-5β-androstan-3-one, 17α-[3'-furyl]-17-hydroxy-5α-androstane-3,11-dione, and 17α-[3'-furyl]-17-hydroxy-5β-androstane-3,11-dione obtained in Example 23 yields respectively 17-[3'-furyl]-5β-androst-16-en-3-one, 17-[3'-furyl]-5α-androst-16-ene-3,11-dione, 17-[3'-furyl]-5β-androst-16-ene-3,11-dione.

EXAMPLE 29

By a similar procedure dehydration of the 3β-acyloxy-17α-[3'-furyl]-5α-androstan-17-ols, and 3β-acyloxy-17α-[3'-furyl]-5β-androstan-17-ols described in Example 27, yields the corresponding 3β-acyloxy-17-[3'-furyl]-5α-androst-16-enes, and 3β-acyloxy-17-[3'-furyl]-5β-androst-16-enes, such as, for example, the 3β-acetoxy-, 3β-propionyloxy-, or 3β-butanoyloxy-17-[3'-furyl]-5α-androst-16-enes, and the 3β-acetoxy-, 3β-propionyloxy- or 3β-butanoyloxy-17-[3'-furyl]-5β-androst-16-enes.

EXAMPLE 30

Hydrogenation, according to the procedure given in Example 16 or 17-[3'-furyl]-5α-androst-16-en-3-one, 17-[3' - furyl]-5β-androst-16-en-3-one, 17-[3'-furyl]-5α-androst-16-ene-3,11-dione, and 17-[3'-furyl]-5β-androst-16-ene-3,11-dione, described in Example 28, yields respectively 17β-[3'furyl]-5α-androstan-3-one M.P. 189–191° C., 17β-[3'-furyl]-5β-androstan-3-one, 17β-[3'-furyl]-5α-androstane-3,11-dione, and 17β-[3'-furyl]-5β-androstane-3,11-dione.

By a similar procedure the 3β-acyloxy-17-[3'-furyl]-5α-androst-16-enes, and 3β-acyloxy-17-[3'-furyl]-5β-androst-16-enes, obtained in Example 29, are hydrogenated to give the corresponding 3β-acyloxy-17β-[3'-furyl]-5α-androstanes, and 3β - acyloxy - 17β-[3'-furyl]-5β-androstanes, such as, for example, the 3β-acetoxy-, 3β-propionyloxy- or 3β-butanoyloxy-17β-[3'-furyl]-5α-androstanes, and the 3β-acetoxy-, 3β - propionyloxy- or 3β - butanoyloxy - 17β-[3'-furyl]-5β-androstanes.

EXAMPLE 31

By a similar procedure as described in U.S. Patent No. 3,271,392, acetylation with acetic anhydride in pyridine solution at 100° C. for 24 hours, of 17α-[3'-furyl]-17-hydroxy-4-androsten-3-one, obtained in Example 3, 17α-[3'-furyl]-17 hydroxy-4-estren-3-one, and 17α-[3'-furyl]-17-hydroxy-4-estrene-3,11-dione, obtained in Example 5, 17α - [3'-furyl]-17-hydroxy-4-androstene-3,11-dione, obtained in Example 6, 17α-[3'-furyl]-17-hydroxy-5α-androstan - 3-one, 17α-[3'-furyl]-17-hydroxy-5β-androstan-3-one, 17α-[3'furyl]-17-hydroxy-5α-androstane-3,11-dione, and 17α-[3'-furyl]-17-hydroxy-5β-androstane-3,11-dione, described in Example 23, yields respectively 17β-acetoxy-17 - [3' - furyl] - 4 - androsten-3-one, 17β-acetoxy-17-[3'-furyl] - 4 - estren - 3 - one, 17β-acetoxy-17-[3'-furyl]-4-estrene - 3,11 - dione, 17β-acetoxy-17-[3'-furyl]-4-androstene-3,11-dione, 17β-acetoxy-17[3'-furyl]-5α-androstan-3-one, 17β - acetoxy - 17-[3'-furyl]-5β-androstan-3-one, 17β-acetoxy-17-[3'-furyl]-5α-androstane-3,11-dione, and 17β-acetoxy-17-[3'-furyl]-5β-androstane-3,11-dione.

Similarly acetylation of 17α-[3'-furyl]-5α-androstane-3β,17-diol and 17α-[3'-furyl]-5β-androstane-3β,17-diol, described in Example 26, yields respectively 3β,17β-diacetoxy-17-[3'-furyl]-5α-androstane, and 3β,17-diacetoxy-17-[3'-furyl]-5β-androstane.

EXAMPLE 32

A 25.5% solution of diisobutyl aluminium hydride in dry tetrahydrofuran (72 ml.), is added dropwise to a solution of digitoxigenin (15 g.), in tetrahydrofuran (200 ml.), at a temperature between −20 and −25° C. in an atmosphere of nitrogen. The reaction mixture is stirred for an additional 20 minutes at the same temperature. A 10% aqueous sulfuric acid solution (50 ml.), is added and the mixture is poured into an aqueous 5% sodium bicarbonate solution. After filtering through celite, the mixture is extracted with ether. The ether extract is washed with water, dried and evaporated to dryness leaving crude 17β-[3'-furyl]-androstane-3β,14β-diol, purified by crystallization from methylene chloride-ether to M.P. 201–203° C.

Similarly, periplogenin yields upon reduction 17β-[3'-furyl]-androstane-3β,5β,14β-triol.

In similar manner, the 19-ethylenedioxy derivative of strophanthidin yields 19-ethylenedioxy-17β-[3'-furyl]-androstane-3β,5β,14β-triol when reduced with diisobutyl aluminium hydride. Upon treatment with 0.1 N hydrochloric acid in acetone solution the latter compound is hydrolyzed to 17β-[3'-furyl]-3β,5β,14β-trihydroxyandrostan-19-al.

EXAMPLE 33

A solution of 17β-[3'-furyl]-5β-androstane-3β,14β-diol (10 g.), obtained as described in Example 32, pyridine (50 ml.), and acetic anhydride (25 ml.), is allowed to stand at room temperature overnight. Methanol (25 ml.), is added and the solution is poured into ice water, and ether extracted. The ether is washed with dilute sulfuric acid, sodium bicarbonate, and water. After drying and evaporating the solvent, the crude acetate is crystallized from aqueous methanol to yield pure 3β-acetoxy-17β-[3'-furyl]-5β-androstan-14β-ol, M.P. 155–157° C.

Similarly, acetylation of 17β-[3'-furyl]-androstane-3β,5β,14β - triol and 17β - [3'-furyl]-3β,5β,14β-trihydroxyandrostan-19-al yields the corresponding 3β-acetoxy-17β-[3'-furyl]-androstane-5β,14β-diol and 3β-acetoxy-5β,14β-dihydroxy-17β-[3'-furyl]-androstan-19-al, respectively.

By a similar procedure acylation with the appropriate acid anhydride or acyl chlorides, such as, for example, propionic anhydride or butyryl chloride of 17β - [3'-furyl] - 5β - androstane-3β,14β-diol, 17β-[3'-furyl]-androstane - 3β,5β,14β-triol and 17β-[3'-furyl]-3β,5β,14β-trihydroxyandrostan - 19-al yields the corresponding 3-acylates: 3β-propionyloxy- or 3β - butyryloxy-17β-[3'-furyl] - 5β-androstane-14β-ol, or 3β-propionyloxy- or 3β-butyryloxy - 17β - [3'-furyl]-androstane-5β,14β-diol or 3β-propionyloxy- or 3β-butyryloxy-17β-[3'-furyl]-5β,14β-dihydroxyandrostan-19-al, respectively.

EXAMPLE 34

N-bromosuccinimide (5.05 g.), is added by portions to a solution of 17α - [3'-furyl]-3-methoxy-1,3,5(10)-estratrien-17-ol (5.0 g.), described in U.S. Patent No. 3,271,-392, dioxan (250 ml.), and water (20 ml.). After stirring for 30 minutes at room temperature, water is added and the mixture is extracted with ether. The ether solution is washed with sodium bicarbonate and water, dried and evaporated, yielding a mixture consisting predominantly of 4 - bromo - 2 - [17'β-hydroxy-3'-methoxy-1',3',5'(10')-estratrien - 17' - yl]-4-hydroxy-2-butenoic acid lactone. Small quantities of 2 - [17'β-hydroxy-3'-methoxy-1',3',5'(10')-estratrien-17'-yl]-4-hydroxy-2-butenoic acid lactone is also present in this mixture.

The above mixture (6.7 g.), is dissolved in acetic acid (335 ml.), and the solution is stirred with zinc dust (33.5 g.), for 1 hour at room temperature. The metal is filtered and the filtrate is diluted with water (3 l.). The resulting solid is filtered, washed with water and dried. The residue is chromatographed on silica gel and the fractions eluted with mixtures of benzene and ether are combined and crystallized from methylene chloride-methanol to give 2 - [17'β-hydroxy-3'-methoxy-1',3',5'(10')-estratrien-17'-yl]-4-hydroxy-2-butenoic acid lactone, M.P. 171–174° C.

EXAMPLE 35

N-chlorosuccinimide (770 mg.) is added by portions to a solution of 17α - [3'-furyl]-3-methoxy-1,3,5(10)-estratrien -17-ol (1 g.), dioxan (50 ml.), water (4.0 ml.), and a 70% perchloric acid solution (0.1 ml.). The reaction mixture is stirred at room temperature for 1 hour, and is worked as in Example 34, to yield a mixture consisting predominantly of 4 - chloro - 2 - [17'β-hydroxy-3'-methoxy - 1',3',5'(10') - estratrien - 17'-yl]-4-hydroxy-2-butenoic acid lactone. Small quantities of 2-[17'β-hydroxy - 3' - methoxy - 1',3',5'(10')-estratrien-17'-yl]-4-hydroxy-2-butenoic acid lactone are also present in the mixture.

The above mixture (1.4 g.) is dissolved in acetic acid (70 ml.), and the solution is stirred for 1 hour with zinc dust (7.0 g.). The reaction is worked up as in Example 34, to yield 2 - [17'β - hydroxy-3'-methoxy-1',3',5'(10')-estratrien - 17' - yl]-4-hydroxy-2-butenoic acid lactone, identical to the lactone obtained in Example 34, as evidenced by infra-red spectroscopy.

Similarly, oxidation as above of 17α - [3' - furyl]-3-methoxy - 1,3,5(10) - estratrien-17-ol, with N-chlorosuccinimide in aqueous dioxan, but without perchloric acid also yields predominantly 4-chloro-2-[17'β-hydroxy-3' - methoxy - 1',3',5'(10')-estratrien-17'-yl]-4-hydroxy-2-butenoic acid lactone, which upon reduction with zinc in acetic acid is transformed into 2 - [17'β - hydroxy-3' - methoxy - 1',3',5'(10')-estratrien-17'-yl]-4-hydroxy-2-butenoic acid lactone.

EXAMPLE 36

By a procedure similar to the one described in Example 34 or 35, the 3-ethyl-, 3-propyl-, 3-isopropyl-, 3-n-butyl-, 3 - sec-butyl-, 3-cyclopentyl- and 3-cyclohexyl-ethers of 17α - [3'-furyl]-1,3,5(10)-estratriene-3,17-diol, described in U.S. Patent No. 3,271,392, are oxidized with N-bromosuccinimide or N-chlorosuccinimide to yield predominantly the corresponding 4-bromo- or 4-chloro-2-[3'-alkoxy- or 3'-cycloalkoxy-17'β-hydroxy-1',3',5'(10')-estratrien - 17' - yl]-4-hydroxy-2-butenoic acid lactones, such as, for example: 4-bromo- or 4-chloro-2-[3'-ethoxy-17'β - hydroxy - 1',3',5'(10')-estratrien-17'-yl-[4-hydroxy-2-butenoic acid lactones, 4-bromo- or 4-chloro-2-[17'β-hydroxy - 3' - propoxy-1',3',5'(10')-estratrien-17'-yl]-4-hydroxy-2-butenoic acid lactones, 4-bromo- or 4-chloro-2 - [17'β - hydroxy-3'-isopropoxy-1',3',5'(10')-estratrien-17' - yl]-4-hydroxy-2-butenoic acid lactones, 4-bromo- or 4-chloro - 2 - [3'n - butoxy-17'β-hydroxy-1',3',5'(10')-estratrien - 17' - yl]-4-hydroxy-2-butenoic acid lactones, 4-bromo- or 4 - chloro - 2 - [3'-sec-butoxy-17'β-hydroxy-1',3',5'(10') - estratrien - 17' - yl]-4-hydroxy-2-butenoic acid lactones, 4-bromo- or 4-chloro-2-[3'-cyclopentyloxy-17'β - hydroxy - 1',3',5'(10') - estratrien-17'-yl]-4-hydroxy-2-butenoic acid lactones, and 4-bromo- or 4-chloro-2 - [3' - cyclohexyloxy-17'β-hydroxy-1',3',5'(10')-estratrien-17'-yl]-4-hydroxy-2-butenoic acid lactones.

The above 4-halolactones are treated with zinc in acetic acid as described in Example 34, to yield the corresponding 2 - [3' - alkoxy- or 3'-cycloalkoxy-17'β-hydroxy-1', 3',5'-(10') - estratrien-17'-yl]-4-hydroxy-2-butenoic acid lactones, such as for example: 2-[3'-ethoxy-17'β-hydroxy-1',3',5'(10') - estratrien - 17'-yl]-4-hydroxy-2-butenoic acid lactone, 2 - [17'β - hydroxy-3'-propoxy-1',3',5'(10')-estratrien - 17' - yl]-4-hydroxy-2-butenoic acid lactone, 2 -[17'β - hydroxy-3'-isopropoxy-1',3',5'(10')-estratrien-17' - yl] - 4 - hydroxy-2-butenoic acid lactone, 2-[3'-n-butoxy - 17'β - hydroxy-1',3',5'(10')-estratrien-17'-yl]-4- hydroxy - 2-butenoic acid lactone, 2-[3'-sec-butoxy-17'β-hydroxy - 1',3',5'(10') - estratrien-17'-yl]-4-hydroxy-2-butenoic acid lactone, 2 - [3' - cyclopentyloxy-17'β-hydroxy - 1',3',5'(10') - estratrien-17'-yl]-4-hydroxy-2-butenoic acid lactone and 2 - [3'-cyclohexyloxy-17'β-hydroxy-1',3',5'(10')-estratrien - 17' - yl]-4-hydroxy - 2 - butenoic acid lactone.

EXAMPLE 37

By a procedure as described in Examples 34 or 35, the 3-acyloxy-17α-[3'furyl]-1,3,5(10)-estratrien-17-ols, described in U.S. Patent No. 3,271,392, are oxidized with N-bromosuccinimide or N-chlorosuccinimide to yield predominantly the 4-bromo- or 4-chloro-2-[3'-acyloxy-17'β - hydroxy-1',3',5'(10')-estratrien-17'-yl]-4-hydroxy-2 - butenoic acid lactones, such as, for example: 4-bromo- or 4 - chloro-2-[3'-acetoxy-17'β-hydroxy-1',3',5'(10')-estratrien - 17'-yl]-4-hydroxy-2-butenoic acid lactones, 4-bromo- or 4-chloro-2-[17'β-hydroxy-3'-propionyloxy-1',3',5'(10') - estratrien-17'-yl]-4-hydroxy-2-butenoic acid lactones, 4-bromo- or 4-chloro-2-[3'-butanoyloxy-1',3',5'(10')-estratrien-17'-yl]-2-butenoic acid lactones.

The above halolactones are treated with zinc dust in acetic acid to yield the corresponding 2-[3'-acyloxy-17'β-hydroxy - 1',3',5'(10')-estratrien-17'-yl]-4-hydroxy-2-butenoic acid lactones, such as, for example: 2-[3'-acetoxy - 17'β-hydroxy-1',3',5'(10')-estratrien-17'-yl]-4-hydroxy-2-butenoic acid lactone, 2-[17'β-hydroxy-3'-propionyloxy - 1',3',5'(10')-estratrien-17'-yl]-4-hydroxy-2-butenoic acid lactone and 2-[3'-butanoyloxy-17'β-hydroxy-1',3',5'(10') - estratrien-17'-yl]-4-hydroxy-2-butenoic acid lactone.

EXAMPLE 38

N-bromosuccinimide (300 mg.) is added by portions to a solution of 17β-acetoxy-17-[3'-furyl]-3-methoxy-1,3,5(10)-estratriene (300 mg.), described in U.S. Patent No. 3,271,392, dioxan (15 ml.), and water (1.2 ml.). The reaction mixture is stirred at room temperature for 30 minutes and the reaction is worked up as in Example 34 to yield predominantly 4 - bromo-2-[17'β - acetoxy-3'-methoxy - 1',3',5'(10')-estratrien-17'-yl]-4-hydroxy-2-butenoic acid lactone.

Oxidation, as in Example 35, of 17β-acetoxy-17-[3'-furyl] - 3-methoxy-1,3,5(10)-estratriene with N-chlorosuccinimide, yields predominantly 4-chloro-2-[17'β-acetoxy - 3' - methoxy-1',3',5'(10')-estratrien-17'-yl]-4-hydroxy-2-butenoic acid lactone.

The halolactones, obtained above, are treated with zinc dust in acetic acid solutions to yield 2-[17'β-acetoxy-3' - methoxy-1',3',5'(10')-estratrien-17'-yl]-4-hydroxy-2-butenoic acid lactone.

By a similar procedure oxidation with N-bromosuccinimide, or N-chlorosuccinimide of 17β-propionyloxy- or 17β - butanoyloxy-17-[3'-furyl]-3-methoxy-1,3,5(10)-estratrienes, described in U.S. Patent No. 3,271,392, yields respectively and predominantly 4-bromo- or 4-chloro-2-[3' - methoxy-17'β-propionyloxy-1',3',5'(10')-estratrien-17'-yl]-4-hydroxy-2-butenoic acid lactones and 4-bromo- or 4 - chloro - 2-[17'β-butanoyloxy-3'-methoxy-1',3',5'(10') - estratrien-17'-yl]-4-hydroxy-2-butenoic acid lactones. These halolactones are reduced with zinc dust in acetic acid to yield 2-[3'-methoxy-17'β-propionyloxy-1',3',5'(10')-estratrien-17'-yl]-4-hydroxy-2-butenoic acid lactone and 2-[17'β-butanoyloxy-3'-methoxy-1',3',5'(10')-estratrien-17'-yl]-4-hydroxy-2-butenoic acid lactone.

By a similar procedure the 3,17β - diacyloxy - 17 - [3'-furyl] - 1,3,5(10)-estratrienes, described in U.S. Patent No. 3,271,392, are oxidized with N-bromosuccinimide or N-chlorosuccinimide to yield predominantly the corresponding 4-bromo- or 4-chloro-2-[3',17'β-diacyloxy-1',3',5'(10') - estratrien-17'-yl]-4-hydroxy-2-butenoic acid lactones, such as, for example: 4-bromo- or 4-chloro-2-[3',17'β - diacetoxy-1',3',5'(10')-estratrien-17'-yl]-4-hydroxy-2-butenoic acid lactones, 4-bromo- or 4-chloro-2-[3',17'β - dipropionyloxy-1',3',5'(10')-estratrien-17'-yl]-4-hydroxy-2-butenoic acid lactones or 4-bromo- or 4-chloro - 2 - [3',17β-dibutanoyloxy-1',3',5'(10')-estratrien-17'-yl]-4-hydroxy-2-butenoic acid lactones. Reduction of the last-named halolactones with zinc in acetic acid gives the corresponding 2-[3',17'β-diacyloxy-1',3',5'(10')-estratrien-17'-yl]-4-hydroxy-2-butenoic acid lactones, such as, for example: 2-[3',17'β-diacetoxy-1',3',5'(10')-estratrien - 17' - yl]-4-hydroxy-2-butenoic acid lactone, 2-[3',17'β - dipropionyloxy - 1',3',5'(10')-estratrien-17'-yl]-4-hydroxy-2-butenoic acid lactone or 2-[3',17'β-dibutanoyloxy - 1',3',5'(10') - estratrien-17'-yl]-4-hydroxy-2-butenoic acid lactone.

EXAMPLE 39

N-bromosuccinimide (1 g.), is added to a solution of 17β - [3' - furyl]-3-methoxy-1,3,5(10)-estratriene (1 g.), obtained in Example 2, dioxan (50 ml.), and water (4.0 ml.). After stirring for 30 minutes at room temperature, the reaction is worked up as in Example 34. The residue is chromatographed on alumina. Elution with benzene-hexane (1:1) gives 4-bromo-2-[3'-methoxy-1',3',5'(10')-estratrien - 17'β - yl]-4-hydroxy-2-butenoic acid lactone, characterized by the lactone band at 1785 cm.$^{-1}$ in its infra-red spectrum.

Further elution with benzene gives 2-[3'-methoxy-1',3',5'(10') - estratrien - 17'β-yl]-4-hydroxy-2-butenoic acid lactone, purified by crystallization with methylene chloride-hexane, M.P. 258–260° C.

EXAMPLE 40

N-bromosuccinimide (206 mg.), is added by portions to a solution of 17β-[3'-furyl]-3-methoxy-1,3,5(10)-estratri-(200 mg.), dioxan (10 ml.), and water (0.8 ml.). The solution is stirred for 30 minutes. The reaction product is isolated as in Example 34 to give a mixture consisting mainly of 4-bromo-2-[3'-methoxy-1',3',5'(10')-estratrien-17'β-yl]-4-hydroxy-2-butenoic acid lactone. A small quantity of 2-[3'-methoxy-1',3',5'(10')-estratrien-17'β-yl] - 4-hydroxy-2-butenoic acid lactone is also present.

This mixture (255 mg.) is dissolved in acetic acid (30 ml.), and the solution is stirred with zinc dust (1.275 g.). The reaction is worked up as in Example 34, to yield 2-[3'-methoxy-1',3',5'(10')-estratrien-17'β - yl] - 4 - hydroxy-2-butenoic acid lactone, M.P. 257–263° C., identical to the lactone obtained in Example 39.

By a procedure similar to thhat described in Example 35 oxidation of 17β-[3'-furyl]-3-methoxy-1,3,5(10)-estratriene with N-chlorosuccinimide yields predominantly 4-chloro-2-[3-methoxy-1',3',5'(10')-estratrien-17'β-yl] - 4-hydroxy-2-butenoic acid lactone, which upon reduction with zinc dust in acetic acid is transformed into 2-[3'-methoxy-1',3',5'(10')-estratrien-17'β-yl] - 4 - hydroxy - 2-butenoic acid lactone.

EXAMPLE 41

In a manner described in Examples 34 or 35, oxidation of the 3-ethyl, 3-proyl, 3-isopropyl, 3-n-butyl, 3-sec.-butyl, 3-cyclopentyl- or 3-cyclohexyl-ethers of 17β-[3'-furyl]-1,3,5(10)-estratrien-3-ol, described in Example 2, with N-bromosuccinimide or N-chlorosuccinimide yields predominantly the corresponding 4-bromo- or 4-chloro-2-[3'-alkoxy- or 3'-cycloalkoxy-1',3',5'(10')-estratrien-17'β-yl]-4-hydroxy-2-butenoic acid lactones, such as, for example: 4-bromo- or 4-chloro-2-[3'-ethoxy-1',3',5'(10')-estratrien-17'β-yl]-4-hydroxy-2-butenoic acid lactones, 4-bromo- or 4-chloro-2-[3'-propoxy-1',3',5'(10')-estratrien-17'β - yl]-4-hydroxy-2-butenoic acid lactone, 4-bromo- or 4-chloro-2-[3'-isopropoxy-1',3',5'(10')-estratrien-17'β - yl] - 4-hydroxy-2-butenoic acid lactones, 4-bromo- or 4-chloro-2-[3'-n-butoxy-1',3',5'(10')-estratrien-17'β-yl]-4-hydroxy-2-butenoic acid lactones, 4-bromo- or 4-chloro-2-[3'-sec.-butoxy-1',3',5'(10')-estratrien-17'β-yl]-4-hydroxy - 2 - butenoic acid lactones, 4-bromo- or 4-chloro-2-[3'-cyclopentyloxy-1',3',5'(10')-estratrien-17'β-yl]-4 - hydroxy - 2-butenoic acid lactones, and 4-bromo- or 4-chloro-2-[3'- cyclohexyloxy-1',3',5'(10')-estratrien - 17'β - yl] - 4 - hydroxy-2-butenoic acid lactones.

The above halolactones are reduced with zinc in acetic acid to yield the corresponding 2-[3'-alkoxy- or 3'-cycloalkoxy-1',3',5'(10')-estratrien-17'β-yl]-4-hydroxy - 2 - butenoic acid lactones, such as, for example: 2-[3'-ethoxy-1',3',5'(10')-estratrien-17'β-yl]-4-hydroxy-2-butenoic acid lactone, 2-[3'-propoxy-1',3',5'(10')-estratrien-17'β-yl] - 4 - hydroxy-2-butenoic acid lactone, 2-[3'-isopropoxy-1',3',5'(10')-estratrien-17'β-yl]-4-hydroxy-2-butenoic acid lactone, 2-[3'-n-butoxy-1',3',5'(10')-estratrien-17'β - yl] - 4-hydroxy-2-butenoic acid lactone, 2-[3'-sec.-butoxy-1',3',5'(10')-estratrien -17'βl]-4-hydroxy - 2 - butenoic acid lactone, 2-[3'-cyclopentyloxy-1',3',5'(10') - estratrien - 17'β-yl]-4-hydroxy-2-butenoic acid lactone, and 2-[3'-cyclohexyloxy-1',3',5'(10')-estratrien-17'β-yl]-4 - hydroxy - 2-butenoic acid lactone.

EXAMPLE 42

By a similar procedure as described in Examples 34 or 35 oxidation of the 3-acyloxy-17β-[3'-furyl]-1,3,5(10)-estratrienes, described in Example 2, with N-bromosuccinimide or N-chlorosuccinimide yields predominantly the 4-bromo- or 4-chloro-2-[3'-acyloxy-1',3',5'(10')-estratrien-17'β-yl]-4-hydroxy-2-butenoic acid lactones such as, for example: 4-bromo- or 4-chloro-2-[3'-acetoxy-1',3',5'(10')-estratrien-17'β-yl]-4-hydroxy-2-butenoic acid lactones, 4-bromo- or 4-chloro-2-[3'-propionyloxy-1',3',5'(10')-estratrien-17'β-yl]-4-hydroxy-2 - butenoic acid lactones, 4-bromo- or 4-chloro-2-[3'-butanoyloxy-1',3',5'(10')-estratrien-17'β-yl]-4-hydroxy-2 - butenoic acid lactones.

The above mentioned halolactones are treated with zinc in acetic acid to yield the corresponding 2-[3'-acyloxy-1',3',5'(10')-estratrien-17'β-yl]-4-hydroxy-2-butenoic acid lactones, such as, for example: 2-[3'-acetoxy-1',3',5'(10')-estratrien-17'β-yl]-4-hydroxy-2-butenoic acid lactone, 2-[3-propionyloxy-1',3',5'(10')-estratrien-17'β-yl] - 4 - hydroxy-2-butenoic acid lactone and 2-[3'-butanoyloxy-1', 3',5'(10')-estratrien-17'β-yl]-4-hydroxy-2 - butenoic acid lactone.

EXAMPLE 43

N-bromosuccinimide (53 mg.) is added by portions to a solution of 17β-[3'-furyl]-3-methoxy-1,3,5(10)-estratriene (100 mg.), dioxan (5 ml.), and water (0.4 ml.). The mixture is stirred for 5 minutes and the reaction is worked up as in Example 34, to give a mixture consisting predominantly of 2-[3'-methoxy-1',3',5'(10')-estratrien-17'β-yl]-4-hydroxy-2-butenoic acid lactone, identified by infrared spectroscopy and by comparative thin layer chromatography with an authentic sample. The mixture also contains small quantites of 4-bromo-2-[3'-methoxy-1',3', 5'(10')-estratrien-17'β-yl]-4-hydroxy-2-butenoic acid lactone.

In a similar manner, but replacing dioxan by tert.-butanol, chloroform, or a mixture of chloroform-acetic acid, 17β - [3'-furyl]-3-methoxy-1,3,5(10) - estratriene is oxidized with N-bromosuccinimide in the presence of water to yield predominantly 2-[3'-methoxy-1',3',5'(10')-estratrien-17'β-yl]-4-hydroxy-2-butenoic acid lactone.

EXAMPLE 44

N-bromosuccinimide (9.8 g.), is added by portions to a mixture of 17α-[3'furyl]-17-hydroxy-4-androstene-3,11-dione (10.0 g.), described in Example 6, dioxan (500 ml.), and water (40 ml.). After stirring at room temperature for 30 minutes, the product of the reaction is isolated as in Example 34, giving predominantly 4 - bromo-2-[3',11'-dioxo-17'β-hydroxy-4'-androsten-17'-yl] - 4 - hydroxy-2-butenoic acid lactone. The latter bromolactone (12 g.) is dissolved in acetic acid (600 ml.), and the solution is stirred for 1 hour at room temperature with zinc dust (60 g.). The product of the reaction, isolated as in Example 34, is crystallized from methylene chloride-methanol yielding 2-[3',11' - dioxo - 17'β-hydroxy-4'-androsten-17'-yl]-4-hydroxy-2-butenoic acid lactone, M.P. 318° (dec.).

Similarly, in the same manner as described in Example 35, oxidation of 17α-[3'-furyl]-17-hydroxy-4-androstene-3,11-dione, with N-chlorosuccinimide yields predominantly 4-chloro-2-[3',11-dioxo-17'β-hydroxy - 4' - androsten-17'-yl]-4-hydroxy-2-butenoic acid lactone, which upon reduction with zinc in acetic acid yields 2-[3',11'-dioxo-17'β-hydroxy-4'-androsten-17'-yl]-4-hydroxy - 2 - butenoic acid lactone.

By a similar procedure 11β,17β - dihydroxy - 17 - [3'-furyl] - 4 - androsten-3-one, described in Example 11, is oxidized with N-bromo- or N-chlorosuccinimide to yield predominantly 4 - bromo- or 4-chloro-2-[11'β,17'β-dihydroxy-3'-oxo-4'-androsten-17'β - yl]-4-hydroxy-2-butenoic acid lactones, which upon reduction with zinc in acetic acid gives 2-[11'β,17'β-dihydroxy - 3' - oxo-4'-androsten-17'-yl]-4-hydroxy-2-butenoic acid lactone.

EXAMPLE 45

N-bromosuccinimide (4.3 g.) is added portionwise to a solution of 17α-[3'-furyl]-17-hydroxy-4-androsten-3-one (4.3 g.), described in Example 3, in dioxan (215 ml.), and water (17.2 ml.). After stirring for 30 minutes, the reaction is worked up as in Example 34, to yield predominantly 4-bromo-2-[17'β-hydroxy - 3' - oxo-4'-androsten-17'-yl]-4-hydroxy-2-butenoic acid lactone. A solution of the latter bromolactone (6.05 g.), in acetic acid (302 ml.), is stirred for 1 hour at room temperature with zinc dust (30.25 g.). The reaction product is isolated as in Example 34, and the residue is chromatographed on silica gel. The fractions eluted with mixtures of benzene-ether are combined and crystallized from methylene chloride ether to give 2-[17'β-hydroxy-3'-oxo-4'-androsten-17'-yl]-ether to give 2-[17'β-hydroxy-3'-oxo-4'-androsten-17'-yl] 4-hydroxy-2-butenoic acid lactone, M.P. 243–245° C.

Similarly oxidation, as in Example 35, of 17α - [3'-furyl]-17-hydroxy-4-androsten-3-one, with N - chlorosuccinimide gives predominantly 4-chloro-2-[17'β-hydroxy-3'-oxo-4'-androsten-17'-yl]-4-hydroxy - 2 - butenoic acid lactone, which when reduced with zinc in acetic acid yields 2-[17'β - hydroxy-3'-oxo-4'-androsten-17'-yl]-4-hydroxy-2-butenoic acid lactone.

EXAMPLE 46

N-bromosuccinimide (2.3 g.) is added by portions to a solution of 17α-[3'-furyl]-17-hydroxy - 4 - estren-3-one (2.0 g.), obtained in Example 5, in dioxan (100 ml.), and water (8.0 ml.). The reaction mixture is stirred for 30 minutes at room temperature and then worked up as in Example 34 to give predominantly 4-bromo-2-[17'β-hydroxy-3'-oxo-4'-estren-17'-yl]-4-hydroxy - 2 - butenoic acid lactone. A solution of this lactone (2.88 g.) in acetic acid (144 ml.) is stirred for 1 hour with zinc dust (14.4 g.). The crude reaction product, isolated as in Example 34, is chromatographed on silica gel. The fractions eluted with benzene-methanol are combined and crystallized from 1,2-dimethoxyethane yielding 2-[17'β-hydroxy-3'-oxo-4'-estren-17'-yl]-4-hydroxy - 2 - butenoic acid lactone, M.P. 222–224° C.

Similarly oxidation by the method of Example 35 of 17α-[3'-furyl]-17-hydroxy-4-estren-3-one with N-chlorosuccinimide gives predominantly 4-chloro-2-[17'β-hydroxy-3'-oxo-4'-estren-17' - yl]-4-hydroxy-2-butenoic acid lactone, which upon reduction with zinc in acetic acid gives 2-[17'β-hydroxy-3'-oxo - 4' - estren-17'-yl]-4-hydroxy-2-butenoic acid lactone.

Similarly oxidation with N-bromosuccinimide or N-chlorosuccinimide of 17α-[3'-furyl] - 17 - hydroxy-4-estrene-3,11-dione obtained in Example 5, and 11β,17β-dihydroxy-17-[3'-furyl]-4-estren-3-one, described in Example 11, yields predominantly 4-bromo- or 4-chloro-2-[3',11'-dioxo-17'β-hydroxy - 4' - estren-17'-yl]-4-hydroxy-2-butenoic acid lactones, and 4 - bromo- or 4 - chloro-2-[11'β,17'β - dihydroxy-3'-oxo-4'-estren-17'-yl]-4-hydroxy- 2-butenoic acid lactones. The latter named halolactones are reduced with zinc in acetic acid to yield respectively 2-[3',11'-dioxo-17'β-hydroxy - 4' - estren-17' - yl]-4-hydroxy - 2 - butenoic acid lactone, and 2-[11'β,17'β-dihydroxy-3'-oxo-4'-estren-17'-yl] - 4-hydroxy-2-butenoic acid lactone.

EXAMPLE 47

N-bromosuccinimide (1.68 g.), is added by portions to a solution of 17β-[3'-furyl]-4-androsten-3-one (3 g.), in dioxan (150 ml.), and water (12 ml.). After stirring for 5 minutes at room temperature, the reaction is worked up as in Example 34 to give a mixture consisting mainly of 2-[3'-oxo-4'-androsten-17'β-yl]-4-hydroxy-2-butenoic acid lactone, purified by chromatography on alumina and by crystallizaiton with methylene chloride-methanol of the fractions eluted with mixtures of benzene-ether, M.P. 284–288° C.

In a similar manner but replacing dioxan by tetrahydrofuran, acetone, benzene, or ethylacetate, oxidation with N-bromosuccinimide of 17β-[3'-furyl]-4-androsten-3-one yields predominantly 2-[3'-oxo-4'-androsten-17'β-yl]-4-hydroxy-2-butenoic acid lactone.

EXAMPLE 48

N-bromoacetamide (44 mg.) is added by portions to a solution of 17β-[3'-furyl]-4-androsten-3-one (100 mg.), in dioxan (5 ml.), and water (0.4 ml.). After stirring for 5 minutes at room temperature, the reaction is worked up as in Example 34 to give a 2-[3'-oxo-4'-androsten-17'β-yl]-4-hydroxy-2-butenoic acid lactone, purified by crystallization of the mixture with methylene chloride-methanol, M.P. 275–281° C. and identical by infra-red comparison to the product obtained in Example 47.

EXAMPLE 49

N-chlorosuccinimide (43 mg.), is added by portions to a solution of 17β-[3'-furyl]-4-androsten-3-one (100 mg.), dioxan (5 ml.), and water (0.4 ml.). The reaction mixture is stirred for 4½ hours and the reaction is worked up as in Example 34. The mixture is crystallized from methylene chloride-methanol to give 2-[3'-oxo-4'-androsten-17'β-yl]-4-hydroxy-2-butenoic acid lactone, M.P. 275–280° C.

Similarly N-chlorosuccinimide (43 mg.) is added by portions to a solution of 17β-[3'-furyl]-4-androsten-3-one (100 mg.), dioxan (5 ml.), water (0.4 ml.), and a 70% solution of perchloric acid (0.06 ml.). After stirring for 4½ hours and working up the reaction as in Example 34, a mixture consisting mainly of 2-[3'-oxo-4'-androsten-17'β-yl]-4-hydroxy-2-butenoic acid lactone is obtained.

EXAMPLE 50

A 1.44 M solution of sodium hypochlorite (0.22 ml.) is added dropwise to a solution of 17β-[3'-furyl]-4-androsten-3-one (100 mg.) in dioxan (5 ml.), water (0.4 ml.), and glacial acetic acid (0.02 ml.). After stirring for 1 hour, the reaction is worked up as in Example 34, to yield predominantly 2-[3'-oxo-4'-androsten-17'β-yl]-4-hydroxy-2-butenoic acid lactone.

EXAMPLE 51

N-bromosuccinimide (510 mg.) is added in portions to a solution of 17β-[3'-furyl]-4-androsten-3-one (500 mg.), described in Example 19, in dioxan (25 ml.), and water (2 ml.). The solution is stirred at room temperature for 30 minutes and the reaction is worked up as in Example 34, yielding a mixture consisting predominantly of 4-bromo-2-[3'-oxo-4'-androsten-17'β-yl]-4-hydroxy-2-butenoic acid lactone. The above mixture (568 mg.) is dissolved in acetic acid (27 ml.), and the solution is stirred with zinc dust (2.7 g.) for 1 hour. The reaction is worked up as in Example 34 and the residue is chromatographed on silica gel. The product eluted with chloroform is crystallized from chloroform-methanol to yield 2-[3'-oxo-4'-androsten-17'β-yl]-4-hydroxy-2-butenoic acid lactone, M.P. 284–287° C.

Similarly oxidation as in Example 35 of 17β-[3'-furyl]-4-androsten-3-one with N-chlorosuccinimide predominantly yields 4-chloro-2-[3'-oxo-4'-androsten-17'β-yl]-4-hydroxy-2-butenoic acid lactone, reduced with zinc in acetic acid to 2-[3'-oxo-4'-androsten-17'β-yl]-4-hydroxy-2-butenoic acid lactone.

By a similar procedure oxidation with N-bromosuccinimide or N-chlorosuccinimide of 17β-[3'-furyl]-4-estren-3-one, described in Example 19, yields predominantly 4-bromo- or 4 - chloro - 2-[3'-oxo-4'-estren-17'β-yl]-4-hydroxy-2-butenoic acid lactones, which upon reduction with zinc in acetic acid are transformed into 2-[3'-oxo-4'-estren-17'β-yl]-4-hydroxy-2-butenoic acid lactone.

EXAMPLE 52

N-bromosuccinimide (5.1 g.), is added portionwise to a solution of 17β-[3'-furyl]-4-androstene-3,11-dione (5.0 g.), described in Example 20, in dioxan (250 ml.), and water (20.0 ml.). After stirring for 30 minutes and working up the reaction as in Example 34, a mixture consisting predominantly of 4-bromo-2-[3',11'-dioxo-4'-androsten-17'β-yl]-4-hydroxy-2-butenoic acid lactone is obtained. This mixture (7.1 g.) is dissolved in acetic acid (300 ml.) and the solution is stirred with zinc dust (30 g.) for 1 hour at room temperature. After working up the reaction as in Example 34, the residue is chromatographed on silica gel. The fractions eluted with benzene-ethyl acetate are combined and crystallized from methylene chloride-methanol to yiled 2-[3',11'-dioxo-4'-androsten-17'β-yl]-4-hydroxy-2-butenoic acid lactone, M.P. 298–301° C.

In a similar manner as described in Example 35, 17β-[3'-furyl]-4-androstene-3,11-dione is oxidized with N-chlorosuccinimide to yield predominantly 4-chloro-2-[3',11'-dioxo-4'-androsten-17'β-yl]-4-hydroxy-2-butenoic acid lactone, transformed by reduction with zinc in acetic acid to 2-[3',11' - dioxo - 4'-androsten-17'β-yl]-4-hydroxy-2-butenoic acid lactone.

By a similar procedure, oxidation with N-bromosuccinimide or N-chlorosuccinimide of 17β-[3'-furyl]-4-estrene-3,11-dione, described in Example 20, yields predominantly 4-bromo- or 4-chloro-2-[3',11'-dioxo-4'-estren-17'β-yl]-4-hydroxy-2-butenoic acid lactones, reduced by zinc in acetic acid to 2-[3',11'-dioxo-4'-estren-17'β-yl]-hydroxy-2-butenoic acid lactone.

EXAMPLE 53

N-bromosuccinimide (4.08 g.), is added by portions to a solution of 17β-[3'-furyl]-11β-hydroxy-4-androsten-3-one (4.0 g.), described in Example 18, in dioxan (200 ml.), and water (16 ml.). After stirring at room temperature for 30 minutes and working up the reaction as in Example 34, a mixture consisting mainly of 4-bromo-2-[11'β-hydroxy - 3' - oxo-4'-androsten-17'β-yl]-4-hydroxy-2-butenoic acid lactone is obtained. This mixture is dissolved in acetic acid (262 ml.), and the solution is stirred for 1 hour at room temperature with zinc dust (26 g.). The reaction is worked up as in Example 34, and the residue is crystallized from methanol to give 2-[11'β-hydroxy-3'-oxo-4'-androsten-17'β-yl] - 4 - hydroxy-2-butenoic acid lactone, M.P. 267–269° C.

Similarly oxidation of 17β-[3'-furyl]-11β-hydroxy-4-androsten-3-one with N-chlorosuccinimide as in Example 35, yields predominantly 4-chloro-2-[11'β-hydroxy-3'-oxo-4'-androsten-17'β-yl]-hydroxy - 2 - butenoic acid lactone, which upon reduction with zinc in acetic acid yields 2-[11'β-hydroxy - 3' - oxo-4'-androsten-17'β-yl]-4-hydroxy-2-butenoic acid lactone.

By a similar procedure oxidation of 17β-[3'-furyl]-11β-hydroxy-4-estren-3-one with N-bromo- or N-chlorosuccinimide gives 4-bromo- or 4-chloro-2-[11'β-hydroxy-3'-oxo-4'-estren-17'β-yl]-4-hydroxy-2-butenoic acid lactones, reduced to 2-[11'β-hydroxy-3'-oxo-4'-estren-17'β-yl]-4- hydroxy-2-butenoic acid lactone with zinc in acetic acid.

EXAMPLE 54

N-bromosuccinimide (1.2 g.) is added to a solution of 3β-acetoxy-17α-[3'-furyl]-5α-androstan-17-ol (1.2 g.), described in Example 27, in dioxan (60 ml.), and water (5 ml.). After stirring for 30 minutes at room temperature, and working up the reaction as in Example 34, the residue is crystallized from ether to give 4-bromo-2-[3'β-acetoxy-17'β-hydroxy-5'α-androstan-17'-yl] - 4 - hydroxy-2-butenoic acid lactone.

This lactone (430 mg.), is dissolved in acetic acid (25 ml.), and the solution is stirred at room temperature with zinc dust (4.3 g.) for 20 minutes. The reaction is worked up as in Example 34, and the residue is crystallized from methylene chloride-ether to give 2 - [3'β - acetoxy-17'β-hydroxy-5'α-androstan-17'-yl]-4-hydroxy-2-butenoic acid lactone, M.P. 223–225° C.

Similarly oxidation as described in Example 35 of 3β-acetoxy-17α-[3'-furyl]-5α-androstan-17-ol with N-chlorosuccinimide yields predominantly 4-chloro-2-[3'β-acetoxy-17'β-hydroxy - 5'α - androstan-17'-yl]-4-hydroxy-2-butenoic acid lactone, which is reduced to 2-[3'β-acetoxy-17'β-hydroxy-5'α-androstan-17'-yl]-4-hydroxy-2-butenoic acid lactone.

By a similar procedure 17α-[3'-furyl]-3β-propionyloxy-5α-androstan-17-ol, and 3β-butanoyloxy - 17α - [3'-furyl] 5α-androstan-17-ol, described in Example 27, are oxidized with N-bromosuccinimide or N-chlorosuccinimide to give predominantly 4-bromo- or 4-chloro-2-[17'β-hydroxy-3'β-propionyloxy - 5α - androstan - 17' - yl]-4-hydroxy-2-butenoic acid lactones, and 4-bromo- or 4-chloro - 2 - [17'β-hydroxy - 3'β - butanoyloxy-5'α-androstan-17'-yl]-4-hydroxy-2-butenoic acid lactones. These halolactones are reduced with zinc in acetic acid to yield 2-[17'β-hydroxy-3'β - propionyloxy-5'α-androstan-17'-yl] - 4 - hydroxy-2-butenoic acid lactone and, 2-[3'β-butanoyloxy-17'β-hydroxy-5'α-androstan-17'-yl]-4-hydroxy - 2 - butenoic acid lactone.

By a similar procedure the 3β-acetoxy-, 3β-propionyloxy- or 3β-butanoyloxy-17α-[3' - furyl]-5β-androstan-17-ols, described in Example 27, are oxidized with N-bromo- or N-chlorosuccinimide to give predominanly 4-bromo- or 4-chloro-2-[3'β - acetoxy-17'β-hydroxy-5'β-androstan-17'-yl]-4-hydroxy-2-butenoic acid lactones, 4-bromo- or 4-chloro-2-[17'β-hydroxy - 3'β - propionyloxy-5'β-androstan-17'-yl]-4-hydroxy-2-butenoic acid lactones, and 4-bromo- or 4-chloro-2-[3'β-butanoyloxy-17'β-hydroxy-5'β-androstan-17'-yl]-4-hydroxy-2-butenoic acid lactones.

The last named halolactones are reduced with zinc in acetic acid to yield 2-[3'β-acetoxy-17'β-hydroxy-5'β-androstan-17'-yl]-4-hydroxy-2-butenoic acid lactone, 2-[17'β-hydroxy - 3'β - propionyloxy-5'β-androstan-17'-yl] 4-hydroxy-2-butenoic acid lactone and 2-[3'β-butanoyloxy-17'β-hydroxy-5'β-androstan-17'-yl] - 4 - hydroxy-2-butenoic acid lactone.

EXAMPLE 55

By a procedure similar to those described in Example 34 or 35, oxidation with N-bromosuccinimide or N-chlorosuccinimide of 17α-[3'-furyl]-17-hydroxy-5α-androstan-3-one, 17α-[3'-furyl] - 17 - hydroxy-5β-androstan-3-one, 17α-[3'-furyl]-5α-androstane - 3,11 - dione, and 17α-[3' furyl]-5β-androstane-3,11-dione, described in Example 23, and 11β,17β-dihydroxy-17-[3'-furyl] - 5α - androstan-3-one, and 11β,17β - dihydroxy-17-[3'-furyl]-5β-androstan-3-one, described in Example 25, yields predominantly 4-bromo- or 4-chloro-2-[17'β-hydroxy-3'-oxo-5'α-androstan-17'-yl]-4-hydroxy-2-butenoic acid lactones, 4-bromo- or 4-chloro-2-[17'β-hydroxy - 3' - oxo-5'β-androstan-17'-yl] 4-hydroxy-2-butenoic acid lactones, 4-bromo- or 4-chloro-2-[3',11'-dioxo-17'β-hydroxy-5'α-androstan - 17' - yl]-4-hydroxy-2-butenoic acid lactones, 4-bromo- or 4-chloro-2-[3',11'-dioxo - 17'β - hydroxy-5'β-androstan-17'-yl]-4-hydroxy-2-butenoic acid lactones, 4-bromo- or 4-chloro-2-[11'β,17'β-dihydroxy - 3' - oxo-5'α-androstan-17'-yl]-4-hydroxy-2-butenoic acid lactones, and 4-bromo- or 4-chloro - 2-[11'β,17'β-dihydroxy-3'-oxo-5'β-androstan-17-yl]-4-hydroxy-2-butenoic acid lactones.

Reduction with zinc and acetic acid of the above halolactones, yields respectively: 2-[17'β-hydroxy-3'-oxo-5'α-androstan-17'-yl]-4-hydroxy-2-butenoic acid lactone, 2-[17'β - hydroxy - 3'-oxo-5'β-androstan-17'yl]-4-hydroxy-2-butenoic acid lactone, 2-[3',11'-dioxo-17'β-hydroxy-5'α-androstan-17'-yl]-4-hydroxy-2-butenoic acid lactone, 2-[3',11' - dioxo - 17'β-hydroxy-5'β-androstan-17'-yl]-4-hydroxy-2-butenoic acid lactone, 2-[11'β,17'β-dihydroxy-3'-oxo-5'α-androstan-17'-yl]-4-hydroxy-2-butenoic acid lacone, and 2-[11'β,17'β-dihydroxy-3'-oxo-5'β-androstan-17'-yl]-4-hydroxy-2-butenoic acid lactone.

EXAMPLE 56

N-bromosuccinimide (2.85 g.), is added by portions to a solution of 17β-[3'-furyl]-5α-androstan-3-one (2.85 g.), obtained in Example 30, in dioxan (140 ml.), and water (11 ml.). After stirring the reaction mixture at room temperature for 30 minutes and isolating the reacting product as described in Example 34, a mixture, consisting mainly in 4 - bromo-2-[3'-oxo-5'α-androstan-17'β-yl]-4-hydroxy-2-butenoic acid lactone, is obtained. This mixture (1.2 g.) is dissolved in acetic acid (75 ml.), and the solution is stirred for 1 hour at room temperature with zinc dust (6 g.). The reaction is worked up as in Example 34, and the residue is crystallized from methylene chloride-ether to give 2 - [3' - oxo-5'α-androstan-17'β-yl]-4-hydroxy-2-butenoic acid lactone, M.P. 230–232° C.

In a manner similar to that described in Example 35, 17β-[3'-furyl]-5α-androstan-3-one, is oxidized with N-chlorosuccinimide to yield predominantly 4-chloro-2-[3'-oxo-5'α-androstan-17'β-yl]-4-hydroxy-2-butenoic acid lactone, which upon reduction with zinc and acetic acid gives 2-[3'-oxo-5'α-androstan-17'β-yl]-4-hydroxy - 2 - butenoic acid lactone.

In a similar manner oxidation with N-bromosuccinimide or N-chlorosuccinimide of 17β-[3'-furyl]5β-androstan-3-one, 17β-[3'-furyl]-5α-androstane-3,11-dione and 17β-[3'-furyl]-5β-androstane-3,11-dione, yields predominantly 4-bromo- or 4-chloro-2-[3'-oxo-5'α-androstan-17'β-yl]-4-hydroxy-2-butenoic acid lactones, 4-bromo- or 4-chloro - 2 - [3',11' - dioxo - 5'α-androstan-17'β-yl]-4-hydroxy-2-butenoic acid lactones, and 4-bromo- or 4-chloro-2 - [3',11' - dioxo - 5'β - androstan-17'β-yl]-4-hydroxy-2-butenoic acid lactones.

The last named halolactones are transformed by reduction with zinc and acetic acid to 2-[3'-oxo-5'β-androstan-17'β-yl]-4-hydroxy-2-butenoic acid lactone, 2-[3',11'-dioxo-5'α-androstan-17'β-yl]-4-hydroxy-2-butenoic acid lactone and 2 - [3',11' - dioxo - 5'β-androstan-17'β-yl]-4-hydroxy-2-butenoic acid lactone.

EXAMPLE 57

N-bromosuccinimide (300 mg.), is added by portions to a solution of 3β-acetoxy-17β-[3'-furyl]-5α-androstane (300 mg.), obtained in Example 30, in dioxan (5 ml.), and water (1.2 ml.). Stirring is continued for 10 minutes and the reaction is worked up as in Example 34, to yield a mixture consisting predominantly of 4-bromo-2-[3'β-acetoxy-5'α-androstan-17'β-yl]-4-hydroxy-2-butenoic acid lactone. This mixture (300 mg.) is dissolved in acetic acid (30 ml.), and the solution is stirred for 30 minutes at room temperature with zinc dust (3.0 g.). The reaction product, isolated as in Example 34, is crystallized from acetonehexane to yield 2-[3'β-acetoxy-5'α-androstan-17'β-yl]-4-hydroxy-2-butenoic acid lactone, M.P. 241–245° C.

In the same manner as described in Example 35, oxidation of 3β-acetoxy-17β-[3'-furyl]-5α-androstane with N-chlorosuccinimide yields predominantly 4-chloro-2-[3'β-acetoxy-5'α-androstan-17'β-yl]-4-hydroxy-2-butenoic acid lactone, which is transformed to 2-[3'β-acetoxy-5'α-androstan-17′β-yl]-4-hydroxy-2-butenoic acid lactone by reduction with zinc in acetic acid.

Similarly, oxidation with N-bromosuccinimide or N-chlorosuccinimide of 17β-[3′-furyl]-3β-propionyloxy-5α-androstane and 3β-butanoyloxy-17β-[3′-furyl]-5-androstane, described in Example 30, gives 4-bromo- or 4-chloro - 2[3′β-propionyloxy-5′α-androstan-17′β-yl]-4-hydroxy-2-butenoic acid lactones, and 4-bromo- or 4-chloro-2 - [3′β - butanoyloxy-5′α-androstane-17′β-yl]-4-hydroxy-2-butenoic acid lactones.

The last-named halolactones are reduced with zinc in acetic acid to yield 2-[3′β-propionyloxy-5′α-androstan-17′β-yl]-4-hydroxy-2-butenoic acid lactone and 2-[3′β-butanoyloxy - 5′α - androstan - 17′β-yl]-4-hydroxy-2-butenoic acid lactone.

In a similar member oxidation with N-bromo- or N-chloro-succinimide of the 3β-acetoxy-, 3β-propionyloxy- or 3β-butanoyloxy-17β-[3′-furyl]-5β-androstanes yields 4-bromo- or 4-chloro-2-[3′β-acetoxy-5′β-androstan-17′β-yl]-4-hydroxy-2-butenoic acid lactones, 4-bromo- or 4-chloro-2 - [3′β - propionyloxy-5′β-androstan-17′β-yl]-4-hydroxy-2-butenoic acid lactones and 4-bromo- or 4-chloro-2-[3′β-butanoyloxy - 5′β - androstan - 17′β-yl]-4-hydroxy-2-butenoic acid lactones.

Reduction of the last-named halolactones yields respectively 2-[3′β-acetoxy-5′β-androstan-17′β-yl]-4-hydroxy-2-butenoic acid lactone, 2-[3′β-propionyloxy-5′β-androstan-17′β-yl]-4-hydroxy-2-butenoic acid lactone and 2-[3′β-butanoyloxy - 5′β - androstan - 17′β-yl]-4-hydroxy-2-butenoic acid lactone.

EXAMPLE 58

By procedure similar to those described in Example 34, or 35 oxidation with N-bromosuccinimide or N-chlorosuccinimide of 17β-acetoxy-17-[3′-furyl]-4-androsten-3-one, 17β-acetoxy-17-[3′-furyl]-4-esterene-3-one, 17β-acetoxy-17-[3′-furyl]-4-estrene-3,11-dione, 17β-acetoxy - 17-[3′-furyl]-4-androstene-3,11-dione-17β - acetoxy - 17-[3′-furyl]-5α-androstan-3-one, 17β-acetoxy-17-[3′-furyl] - 5β-androstan-3-one, 17β-acetoxy-17-[3′ - furyl] - 5α-androstane-3,11-dione, 17β - acetoxy-17 - [3′-furyl]-5β-androstane-3,11-dione, 3β,17β-diacetoxy - 17-[3′ - furyl]-5α-androstane and 3β,17β-diacetoxy-17 - [3′-furyl]-5β-androstane obtained in Example 31 gives 4-bromo- or 4-chloro-2-[17′β-acetoxy-3′-oxo-4′-androsten-17′-yl] - 4 - hydroxy-2-butenoic acid lactones, 4-bromo- or 4-chloro-2-[17′β-acetoxy-3′-oxo - 4′ - estren-17′-yl]-4-hydroxy-2-butenoic acid lactones, 4-bromo- or 4-chloro-2-[17′β-acetoxy-3′, 11′ - dioxo-4 - estren-17′-yl]-4-hydroxy-2-butenoic acid lactones, 4-bromo- or 4-chloro-2-[17′β-acetoxy-3′,11′-dioxo - 4′ - androsten-17′-yl]-4-hydroxy-2-butenoic acid lactones, 4-bromo- or 4-chloro-2-[17′β-acetoxy-3′ - oxo-5′α-androstan - 17′ - yl]-4-hydroxy-2-butenoic acid lactones, 4-bromo- or 4-chloro-2-[17′β-acetoxy-3′-oxo-5′β-androstan-17′ - yl] - 4-hydroxy-2-butenoic acid lactones, 4-bromo- or 4-chloro-2-[17′β-acetoxy-3′,11′ - dioxo-5′α-androstan - 17′ - yl]-4-hydroxy-2-butenoic acid lactones, 4-bromo- or 4-chloro-2-[17′β-acetoxy-3′,11′ - dioxo-5′β-androstan-17′-yl]-4-hydroxy - 2 - butenoic acid lactones, 4-bromo- or 4-chloro-2-[3′β,17′β-diacetoxy - 5′α-androstan-17′ - yl]-4-hydroxy-2-butenoic acid lactones anr 4-brom- or 4 - chloro-2-[3′β,17′β-diacetoxy-5′β-androstan-17′-yl]-4-hydroxy-2-butenoic acid lactones.

These halolactones are transformed by reduction with zinc in acetic acid to 2-[17′β-acetoxy-3′-oxo-4′-androsten-17′-yl]-4-hydroxy-2-butenoic acid lactone, 2 - [17′β-acetoxy-3′-oxo-4′-estren-17′-yl]-4-hydroxy - 2 - butenoic acid lactone, 2-[17′β-acetoxy-3′,11′-dioxo-4′-estren-17′ - yl]-4-hydroxy-2-butenoic acid lactone, 2-[17′β-acetoxy - 3′,11′-dioxo-4′-androsten-17′-yl]-4-hydroxy-2-butenoic acid lactone, 2-[17′β-acetoxy-3′-oxo-5′α-androstan-17′-yl] - 4-hydroxy-2-butenoic acid lactone, 2-[17′β-acetoxy-3′-oxo-5′β-androstan-17′-yl]-4-hydroxy-2 - butenoic acid lactone, 2-[17′β-acetoxy-3′,11′-dioxo-5′α-androstan - 17′ - yl]-4-hydroxy-2-butenoic acid lactone, 2-[17′-β-acetoxy - 3′,11′-dioxo-5′β-androstan-17′-yl]-4-hydroxy - 2 - butenoic acid lactone, 2-[3′β,17′β - diacetoxy - 5′α-androstan-17′-yl]-4-hydroxy-2-butenoic acid lactone and 2-[3′β,17′β-diacetoxy-5′β-androstan-17′-yl]-4 - hydroxy - 2 - butenoic acid lactone.

EXAMPLE 59

A mixture of 2-[11′β-hydroxy-3′-oxo-4′-androsten-17′β-yl]-4-hydroxy-2-butenoic acid lactone (4.25 g.), described in Example 53, 2,3-dichloro-5,6-dicyanoquinone, (3.2 g.), p-toluenesulfonic acid (2.06 g.), in dioxan (127.5 ml.), is refluxed for 3½ hours. After cooling, the hydroquinone is filtered and the filtrate is evaporated to dryness. The residue is dissolved in a mixture of chloroform-ether and the organic solution is washed with sodium bicarbonate until no colour is extracted and with water. After drying and evaporating the solution, the residue is chromatographed on silica gel. The fractions eluted with ether are combined and crystallized from nitromethane-methanol giving 2-[11′β-hydroxy-3′-oxo - 1′,4′-androstadien-17′β-yl]-4-hydroxy-2 - butenoic acid lactone, M.P. 248–250° C.

In a similar manner oxidation with 2,3-dichloro-5,6-dicyanoquinone of 2-[3′,11′-dioxo-17′β-hydroxy-4′-androsten-17′-yl]-4-hydroxy-2-butenonic acid lactone, and 2-[11′β,17′β - dihydroxy - 3′-oxo-4′-androsten-17′-yl]-4-hydroxy-2-butenoic acid lactone, obtained in Example 44; 2-[17′β-hydroxy-3′-oxo-4′-androsten-17′-yl] - 4 - hydroxy-2-butenoic acid lactone, obtained in Example 45; 2-[3′-oxo-4′-androsten - 17′β - yl]-4-hydroxy-2-butenoic acid lactone, obtained in Example 47; 2-[3′,11′-dioxo-4′-androsten-17′β-yl]-4 - hydroxy - 2-butenoic acid lactone, obtained in Example 52; 2-[17′β-acetoxy-3′-oxo-4′-androsten-17′ - yl]-4 - hydroxy-2-butenoic acid lactone, and 2-[17′β-acetoxy-3′,11′-dioxo-4′-androsten-17′-yl] - 4 - hydroxy-2-butenoic acid lactone, obtained in Example 58 yields, 2-[3′,11′-dioxo-17′β-hydroxy-1′,4′ - androstadien-17′-yl]-4-hydroxy-2-butenoic acid lactone, 2-[11′β,17′β-dihydroxy-3′-oxo-1′,4′-androstadien-17′-yl]-4-hydroxy - 2-butenoic acid lactone, 2-[17′β-hydroxy-3′-oxo-1′,4′-androstadien-17′-yl]-4-hydroxy-2-butenoic acid lactone, 2 - [3′-oxo-1′,4′-androstadien-17′β-yl]-4-hydroxy-2-butenoic acid lactone, 2-[3′,11′-dioxo-1′,4′-androstadien-17′β-yl] - 4-hydroxy-2-butenoic acid lactone, 2-[17′β-acetoxy-3′ - oxo-1′,4′-androstadien-17′-yl]-4-hydroxy-2-butenoic acid lactone, and 2-[17′β-acetoxy-3′,11′-dioxo-1′,4′-androstadien-17′-yl]-4-hydroxy-2-butenoic acid lactone, respectively.

EXAMPLE 60

N-bromosuccinimide (900 mg.) is added portionwise to a stirred solution of 3β-acetoxy-17β-[3′-furyl]-5β-androstan-14β-ol, obtained in Example 33 (2 g.), in dioxan (100 ml.), and water (8 ml.), and the reaction is allowed to proceed for 30 minutes at room temperature. The solution is diluted with water and ether extracted. The ether extracts are washed with water, dried and evaporated. The residue is chromatographed on silica gel, and the fractions eluted with benzene-ether (3:1) are combined and crystallized from mixtures of methylene chloride-ether to yield pure 3β-acetoxy-23-desoxo-14-hydroxy-21-oxo-5β-card-20(22)-enolide, M.P. 172–173° C.

Similarly, 3β-acetoxy-17β-[3′-furyl]-androstane-5β,14β-diol, and 3β-acetoxy-5β,14β-dihydroxy-17β-[3′-furyl]-androsten-19-al yield, respectively 3β-acetoxy-23-desoxo-5β,14-dihydroxy-21-oxocard-20(22)-enolide and 3β-acetoxy-23-desoxo-5β,14-dihydroxy-19,21 - dioxocard - 20(22)-enolide when treated with N-bromosuccinimide.

The same products as described above are also obtained when using equivalent amounts of N-chlorosuccinimide instead of N-bromosuccinimide, and allowing the reaction to proceed as above for approximately five hours.

Alternatively, the same compounds as described above are also obtained when adding 0.8 ml. of water and 0.04 ml. of glacial acetic acid to a solution of 200 mg. of the same starting materials as described above, then adding dropwise an aqueous solution of sodium hypochlorite (1.44 M, 0.5 ml.), stirring at room temperature for approximately one hour, and working up as described above.

EXAMPLE 61

In the same manner as described in Example 60, the 3-acylates such as the 3-propionates and 3-butyrates of 17β-[3′-furyl]-5β-androstane-3β,14β-diol, 17β-[3′-furyl]-androstane-3β,5β,14β-triol, and 17β-[3′-furyl]-3β,5β,14β-trihydroxyandrostan-19-al described in Example 33 are treated with N-bromosuccinimide to yield the 3-acrylates, such as, for example, the 3-propionates and 3-butyrates of 23-desoxo-3β,14-dihydroxy-21-oxo-5β - card - 20(22)-enolide, 23-desoxo-21-oxo-3β,5β,14 - trihydroxycard-20 (22)-enolide and 23-desoxo-19,21-dioxo-3β,5β,14-trihydroxycard-20(22)-enolide, respectively.

EXAMPLE 62

To 3β-acetoxy-17β-[3′-furyl]-5β-androstan-14-ol, obtained as described in Example 33 (0.200 g.), in dioxan (10 ml.), and water (0.8 ml.), is added portionwise N-bromosuccinimide (0.180 g.), and the mixture is stirred at room temperature for one half hour. The solution is diluted with ether, washed with saturated sodium chloride solution, dried and evaporated. The oily residue contains 3β-acetoxy-23-bromo-14-hydroxy-23-desoxo-21 - oxo-5β-cardenolide, characterized by NMR spectroscopy with characteristic peaks at 6.91 p.p.m. and 7.18 p.p.m.

The above oily residue is stirred in acetic acid (20 ml.), with zinc (2.2 g.), for a period of one half hour. The zinc powder is then removed by filtration and the filtrate diluted with chloroform. The organic layer is washed with water till neutral, dried, and evaporated, to leave 3β-acetoxy-14-hydroxy-23-desoxo-21-oxo - 5β - cardenolide, identical with the product described in Example 60.

In the same manner, but using N-chlorosuccinimide instead of N-bromosuccinimide, 3β-acetoxy-23-chloro-14-hydroxy-23-desoxo-21-oxo-5β-cardenolide is obtained from which 3β-acetoxy-14-hydroxy-23-desoxo-21-oxo-5β-cardenolide is obtained in the same manner as described above.

EXAMPLE 63

A solution of 3β-acetoxy-23-desoxo-14-hydroxy-21-oxo-5β-card-20(22)-enolide (200 mg.) obtained in Example 60, potassium carbonate (200 mg.), methanol (8 ml.), and water (2 ml.), is refluxed for two hours. After cooling, the solution is acidified with acetic acid, diluted with water and extracted with a mixture of methylene chloride and ethyl acetate. The organic solvents are washed with water, dried and evaporated yielding 23-desoxo-3β,14-dihydroxy-21-oxo-5β-card-20(22) - enolide, characterized by infrared absorption bands at 3595 cm.⁻¹; 1745 cm.⁻¹, and 1645 cm.⁻¹.

Similarly, 3β-acetoxy-23-desoxo-5β,14 - dihydroxy-21-oxocard-20(22)-enolide and 3β-acetoxy-23-desoxo-5β,14-dihydroxy-19,21-dioxocard-20(22)-enolide described in Example 60 are hydrolyzed to yield, respectively, 23-desoxo-21-oxo-3β,5β,14-trihydroxycard - 20(22)-enolide and 23-desoxo-19,21-dioxo-3β,5β,14 - trihydroxycard-20 (22)-enolide.

In a similar manner, the 3-propionates and 3-butyrates of 23-desoxo-3β,14-dihydroxy-21-oxo-5β-card - 20(22)-enolide, 23-desoxo-21-oxo-3β,5β,14 - trihydroxycard-20 (22)-enolide and 23-desoxo-19,21-dioxo-3β,5β,14-trihydroxycard-20(22)-enolide obtained as described in Example 61, yield upon hydrolysis 23-desoxo-3β,14-dihydroxy-21-oxo-5β-card-20(22)-enolide, 23-desoxo-21-oxo-3β,5β,14-trihydroxycard-20(22)-enolide and 23-desoxo-19,21-desoxo-3β,5β,14-trihydroxycard - 20(22) - enolide, respectively.

EXAMPLE 64

23-desoxo - 3β,14 - dihydroxy-21-oxo-5β-card-20(22)-enolide (375 mg.) obtained as described in Example 63, dissolved in 10 ml. of dry dioxan, is stirred at room temperature with 500 mg. of dry silver oxide and 1 g. of anhydrous magnesium sulfate. A solution of 820 mg. of acetobromoglucose is added over a period of one hour, and stirring is continued for 24 hours at room temperature. After working up as described by Elderfield et al. cited above, 23-desoxo-3β,14-dihydroxy-21-oxo-5β-card-20(22)-enolide 3β-d-tetraacetyl-glucoside is obtained.

In the same manner, but using 23-desoxo-21-oxo-3β,5β, 14-trihydroxycard-20(22)-enolide or 23-desoxo-19,21-dioxo-3β,5β,14-trihydroxycard-20(22)-enolide instead of 23-desoxo - 3β,14 - dihydroxy - 21 - oxo-5β-card-20(22)-enolide, the corresponding tetraacetyl-β-d-glucosides, viz, 23-desoxo - 21 - oxo - 3β,5β,14 - trihydroxycard-20(22)-enolide-3-β-d-tetraacetyl-glucoside and 23-desoxo-19,21-dioxo-3β,5β,14-trihydroxycard - 20(22) - enolide-3-β-d-tetraacetyl-glucoside, are respectively obtained.

By hydrolysis of the 3-β-d-tetraacetyl-glucosides obtained above, in dry methanol with approximately 0.05 N barium methoxide following the procedure described by Elderfield et al., cited above, 23-desoxo-3β,14-dihydroxy-21-oxo-5β-card-20(22)-enolide-3-β-d-glucoside, 23-desoxo-21-oxo-3β,5β,14-trihydroxycard - 20(22) - enolide-3-β-d-glucoside, and 23-desoxo-19,21-dioxo-3β,5β,14-trihydroxycard-20(22)-enolide-3-β-d-glucoside are respectively obtained.

We claim:
1. A compound selected from the group consisting of steroid compounds of the formula

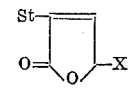

wherein St represents a steroid selected from those of the formulae

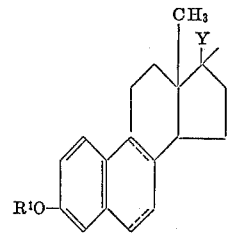 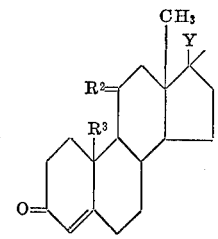

and

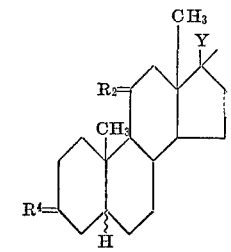

wherein R¹ is selected from hydrogen, lower alkyl groups containing from one to four carbon atoms, cycloalkyl groups containing from five to six carbon atoms and lower aliphatic acyl groups; R² is selected from two atoms of hydrogen, a hydroxyl group and a hydrogen atom, and an oxygen atom; $R^3$ is selected from hydrogen and methyl; $R^4$ is selected from a hydroxyl group and a hydrogen atom, a lower aliphatic acyloxy group and a hydrogen atom, and an oxygen atom; Y is selected from hydrogen, hydroxyl, and lower aliphatic acyloxy groups and X is a substituent selected from the group which consists of hydrogen, chlorine and bromine; said attachment to said steroid nucleus St being at position-17 thereof; and the dotted lines in ring B indicating that two double bonds in positions 6–7 and 8–9 may be present therein.

2. 2-[17′β-hydroxy-3′-methoxy-1′,3′,5′(10′)-estratrien-17′-yl]-4-hydroxy-2-butenoic acid lactone, as claimed in claim 1.

3. 2-[3′-methoxy - 1′,3′,5′(10′) - estratrien-17′β-yl]-4-hydroxy-2-butenoic acid lactone, as claimed in claim 1.

4. 2-[17′β-hydroxy-3′-oxo-4′ - androsten - 17′-yl]-4-hydroxy-2-butenoic acid lactone, as claimed in claim 1.

5. 2-[3′,11′-dioxo-17′β-hydroxy-4′-androsten-17′-yl]-4-hydroxy-2-butenoic acid lactone, as claimed in claim 1.

6. 2-[11′β,17′β - dihydroxy-3′-oxo-4′-androsten-17′-yl]-4-hydroxy-2-butenoic acid lactone, as claimed in claim 1.

7. 2-[17′β-hydroxy-3′-oxo-4′-estren-17′-yl]-4-hydroxy-2-butenoic acid lactone, as claimed in claim 1.

8. 2-[3′,11′-dioxo-17′β - hydroxy - 4′-estren-17′-yl]-4-hydroxy-2-butenoic acid lactone, as claimed in claim 1.

9. 2-[11′β,17′β - dihydroxy - 3′-oxo-4′-estren-17′-yl]-4-hydroxy-2-butenoic acid lactone, as claimed in claim 1.

10. 2-[3′-oxo - 4′ - androsten - 17′β - yl]-4-hydroxy-2-butenoic acid lactone, as claimed in claim 1.

11. 2-[3′,11′ - dioxo-4′-androsten-17′β-yl]-4-hydroxy-2-butenoic acid lactone, as claimed in claim 1.

12. 2-[3′-oxo-4′-estren - 17′β-yl]-4-hydroxy-2-butenoic acid lactone, as claimed in claim 1.

13. 2-[3′,11′-dioxo-4′-estren-17′β-yl] - 4 - hydroxy-2-butenoic acid lactone, as claimed in claim 1.

14. 2-[17′β-hydroxy-3′-oxo-1′,4′-androstadien-17′-yl]-4-hydroxy-2-butenoic acid lactone, as claimed in claim 1.

15. 2-[3′,11′-dioxo - 17′β - hydroxy-1′,4′-androstadien-17′-yl]-4-hydroxy-2-butenoic acid lactone, as claimed in claim 1.

16. 2-[3′-oxo-1′,4′-androstadien-17′β-yl] - 4 - hydroxy-2-butenoic acid lactone, as claimed in claim 1.

17. 2-[3′,11′-dioxo - 1′,4′ - androstadien - 17′β - yl]-4-hydroxy-2-butenoic acid lactone, as claimed in claim 1.

18. The process which comprises treating with a hypohalous acid, a steroid compound of the formula

wherein St represents a steroid selected from those of the formulae

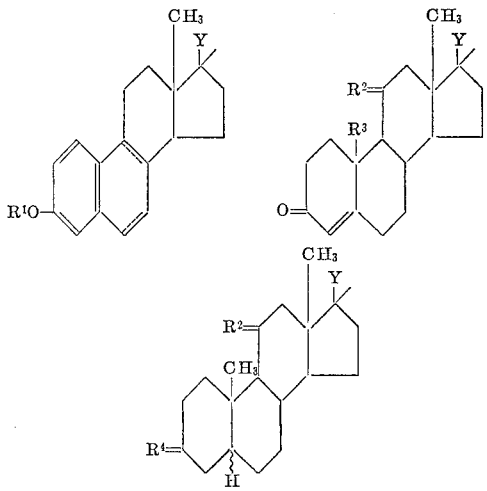

wherein $R^1$ is selected from hydrogen, lower alkyl groups containing from one to four carbon atoms, cycloalkyl groups containing from five to six carbon atoms and lower aliphatic acyl groups; $R^2$ is selected from two atoms of hydrogen, a hydroxyl group and a hydrogen atom, and an oxygen atom; $R^3$ is selected from hydrogen and methyl; $R^4$ is selected from a hydroxyl group and a hydrogen atom, a lower aliphatic acyloxy group and a hydrogen atom, and an oxygen atom; Y is selected from hydrogen, hydroxyl, and lower aliphatic acyloxy groups and X is a substituent selected from the group which consists of hydrogen, chlorine, and bromine; said attachment to said steroid nucleus St being at position-17 thereof; and the dotted lines in ring B indicating that two double bonds in positions 6–7 and 8–9 may be present therein, thereby oxidizing said furan ring portion of said steroid compound to the corresponding 4-hydroxy-2-butenoic acid lactone.

References Cited

UNITED STATES PATENTS

| 2,968,596 | 1/1961 | Meister et al. | 260—239.57 |
| 3,177,200 | 4/1965 | Meyer | 260—210.5 |
| 3,211,719 | 10/1965 | Von Wartberg et al. | 260—210.5 |

LEWIS GOTTS, *Primary Examiner.*

JOHNNIE R. BROWN, *Assistant Examiner.*

U.S. Cl. X.R.

260—210.5, 239.55, 397.4, 397.45, 239.5; 424—241

UNITED STATES PATENT OFFICE
CERTIFICATE OF CORRECTION

Patent No. 3,431,258                                March 4, 1969

Yvon Lefebvre et al.

It is certified that error appears in the above identified patent and that said Letters Patent are hereby corrected as shown below:

Column 6, formula XIII should appear as shown below:

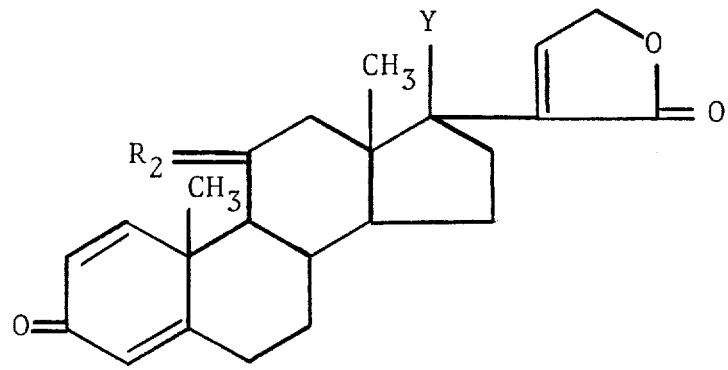

Signed and sealed this 7th day of April 1970.

(SEAL)
Attest:

EDWARD M. FLETCHER, JR.                WILLIAM E. SCHUYLER, JR.
Attesting Officer                          Commissioner of Patents